United States Patent
Kako et al.

(10) Patent No.: US 6,901,744 B2
(45) Date of Patent: Jun. 7, 2005

(54) AIR-FUEL RATIO CONTROL APPARATUS OF INTERNAL COMBUSTION ENGINE

(75) Inventors: Junichi Kako, Susono (JP); Toshinari Nagai, Sunto-gun (JP); Naohide Fuwa, Susono (JP); Kazunori Kojima, Susono (JP); Akihiro Katayama, Susono (JP); Naoto Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/212,105

(22) Filed: Aug. 6, 2002

(65) Prior Publication Data

US 2002/0194840 A1 Dec. 26, 2002

Related U.S. Application Data

(62) Division of application No. 09/880,029, filed on Jun. 14, 2001, now Pat. No. 6,481,201.

(30) Foreign Application Priority Data

Jun. 26, 2000 (JP) ........................................ 2000-191677

(51) Int. Cl.⁷ ................................................ F01N 3/00
(52) U.S. Cl. ............................. 60/285; 60/276; 60/277; 123/109
(58) Field of Search ......................... 60/274, 276, 277, 60/285, 286, 295; 701/103, 109

(56) References Cited

U.S. PATENT DOCUMENTS

| 5,293,740 A | 3/1994 | Heppner et al. ............... 60/274 |
| 5,335,538 A | 8/1994 | Blischke et al. |
| 5,487,269 A | 1/1996 | Atanasyan et al. |
| 5,503,134 A | 4/1996 | Delosh et al. |
| 5,609,023 A | 3/1997 | Katoh et al. ................... 60/276 |
| 5,755,212 A | 5/1998 | Ajima |
| 5,842,340 A | 12/1998 | Bush et al. .................... 60/274 |
| 5,901,552 A | 5/1999 | Schnaibel et al. ............. 60/274 |
| 6,289,673 B1 * | 9/2001 | Tayama et al. ................ 60/285 |
| 6,629,409 B2 * | 10/2003 | Lewis et al. ................... 60/285 |
| 6,637,195 B2 * | 10/2003 | Sakai et al. .................... 60/285 |

FOREIGN PATENT DOCUMENTS

| JP | 5-133264 A | 5/1993 |
| JP | 5-195842 A | 8/1993 |
| JP | 6-159048 A | 6/1994 |
| JP | 6-249028 A | 9/1994 |
| JP | 7-151002 A | 6/1995 |
| JP | 7-259602 A | 10/1995 |
| JP | 9-280038 A | 10/1997 |
| JP | 9-310635 A | 12/1997 |

* cited by examiner

Primary Examiner—Binh Q. Tran
(74) Attorney, Agent, or Firm—Oliff & Berridge, PLC

(57) ABSTRACT

An air-fuel ratio control apparatus of an internal combustion engine according to the present invention is provided with oxygen storage amount estimating means, downstream exhaust air-fuel ratio detecting means, maximum oxygen storage amount estimating means, and air-fuel ratio target setting means. The oxygen storage amount estimating means estimates an oxygen storage amount of an exhaust purifying catalyst, based on a history of an oxygen adsorption/desorption amount of the exhaust purifying catalyst located on an exhaust path. The downstream exhaust air-fuel ratio detecting means is located downstream of the exhaust purifying catalyst and detects an exhaust air-fuel ratio downstream of the exhaust purifying catalyst. The maximum oxygen storage amount estimating means estimates a maximum oxygen storage amount, based on an oxygen storage amount estimate when the exhaust air-fuel ratio detected is a predetermined air-fuel ratio. This permits effective utilization of oxygen occlusion capability of the exhaust purifying catalyst and improvement in exhaust purification performance.

4 Claims, 18 Drawing Sheets

AIR-FUEL RATIO CONTROL APPARATUS OF INTERNAL COMBUSTION ENGINE

BACKGROUND OF THE INVENTION

1. Field of Invention

The present invention relates to air-fuel ratio control apparatus of internal combustion engine.

2. Description of Related Art

For purifying exhaust gas from the internal combustion engine, an exhaust purifying catalyst (three-way catalyst) is placed on the exhaust path, an air-fuel ratio sensor is located on the exhaust path to detect the air-fuel ratio (A/F), and feedback control is implemented so as to control an air-fuel mixture toward the stoichiometric air-fuel ratio, thereby simultaneously decreasing nitrogen oxides (NOx), carbon monoxide (CO), and hydrocarbons (HC). The purification efficiency of exhaust gas emitted from the internal combustion engine is further increased effectively by carrying out the foregoing feedback control with accuracy.

SUMMARY OF THE INVENTION

The inventors found that further improvement was made in the purification efficiency of NOx, CO, and HC, noting the oxygen occlusion function of the exhaust purifying catalyst. An object of the present invention is to provide air-fuel ratio control apparatus of internal combustion engine with superior exhaust purifying characteristics, while effectively making use of the oxygen occlusion function of the exhaust purifying catalyst.

The air-fuel ratio control apparatus of the internal combustion engine according to the present invention was accomplished based on the above finding and comprises oxygen storage amount estimating means, downstream exhaust air-fuel ratio detecting means, maximum oxygen storage amount estimating means, and air-fuel ratio target setting means. The oxygen storage amount estimating means estimates an oxygen storage amount of an exhaust purifying catalyst, based on a history of an oxygen adsorption/desorption amount of the exhaust purifying catalyst located on an exhaust path. The downstream exhaust air-fuel ratio detecting means is located downstream of the exhaust purifying catalyst and detects an exhaust air-fuel ratio downstream of the exhaust purifying catalyst. The maximum oxygen storage amount estimating means estimates a maximum oxygen storage amount, based on an oxygen storage amount estimate when the exhaust air-fuel ratio detected is a predetermined air-fuel ratio. This permits effective utilization of the oxygen occlusion capability of the exhaust purifying catalyst and improvement in the exhaust purification performance.

Further, the apparatus may also be configured to set a target of amount of oxygen occluded in the exhaust purifying catalyst (oxygen storage amount), to approximately half of a maximum storage amount of oxygen that the exhaust purifying catalyst can occlude (maximum oxygen storage amount) and control the air-fuel ratio so as to bring the oxygen storage amount toward this target. In this case, if the maximum oxygen storage amount is a fixed value (or a corrected value from the fixed value), there will also appear situations that do not always reflect the real maximum oxygen storage amount and there can also appear circumstances failing to utilize the performance of the exhaust purifying catalyst at its maximum. Therefore, improvement may be made so as to achieve further advanced purification characteristics. The inventors also investigated it and invented more preferable apparatus as described below.

In a preferable aspect, the oxygen storage amount estimating means estimates the oxygen storage amount, based on a quantity of fuel supplied into a cylinder, which is predicted according to a fuel behavior model taking account of fuel attaching onto an internal surface of an intake path of the internal combustion engine. In a further preferable aspect, the apparatus further comprises an upstream air-fuel ratio sensor located upstream of the exhaust purifying catalyst on the exhaust path, for detecting an exhaust air-fuel ratio upstream of the exhaust purifying catalyst, and the oxygen storage amount estimating means estimates the oxygen storage amount in consideration of a response delay of the upstream air-fuel ratio sensor.

In another preferable aspect, the oxygen storage amount estimating means estimates the oxygen storage amount, based on a passing gas flow rate of gas passing through the exhaust purifying catalyst. In still another preferable aspect, the oxygen storage amount estimating means estimates the oxygen storage amount, based on the magnitude of change of the air-fuel ratio of the internal combustion engine.

In a further preferable aspect, the maximum oxygen storage amount estimating means further corrects the maximum oxygen storage amount estimated, based on a passing gas flow rate of gas passing through the exhaust purifying catalyst. In another preferable aspect, the maximum oxygen storage amount estimating means further corrects the maximum oxygen storage amount estimated, based on the magnitude of change of the controlled air-fuel ratio.

In a further preferable aspect, the oxygen storage amount estimating means estimates the oxygen storage amount, based on composition of exhaust gas flowing into the exhaust purifying catalyst, which is predicted according to a combustion model. In a more preferable aspect herein, the combustion model is modified based on quality of fuel. In another more preferable aspect, the combustion model is modified according to an operational state of the internal combustion engine.

In another preferable aspect, a result of detection by the downstream exhaust air-fuel ratio detecting means is corrected based on the composition of exhaust gas flowing into the exhaust purifying catalyst. In a more preferable aspect herein, the composition of the exhaust gas is predicted according to a combustion model.

In another preferable aspect, the apparatus further comprises abnormality determining means for determining whether the oxygen storage amount estimated is abnormal, based on the oxygen storage amount estimated and the downstream exhaust air-fuel ratio detected. In a more preferable aspect herein, when determining that the oxygen storage amount estimated is abnormal, the abnormality determining means deletes the old history of the oxygen storage amount and initiates new estimation of the oxygen storage amount. In a further more preferable aspect, when determining that the oxygen storage amount estimated is abnormal, the abnormality determining means modifies an oxygen occlusion amount estimation model.

In another preferable aspect, the apparatus further comprises abnormality determining means for determining that the maximum oxygen storage amount estimated is abnormal, when the maximum oxygen storage amount estimated by the maximum oxygen storage amount estimating means exceeds a predetermined value.

In another preferable aspect, the apparatus further comprises catalyst deterioration detecting means for detecting a degree of deterioration of the exhaust purifying catalyst, based on a change slope of the exhaust air-fuel ratio detected by the downstream exhaust air-fuel ratio detecting means.

In another preferable aspect, a blow-by occurrence oxygen storage amount, at which a blow-by phenomenon not utilizing the oxygen occlusion capability of the exhaust purifying catalyst fully occurs, is preliminarily set and the oxygen storage amount is calibrated based on the blow-by occurrence oxygen storage amount upon occurrence of the blow-by phenomenon.

In another preferable aspect, the apparatus further comprises storage amount target setting means for setting an oxygen storage amount target, based on the maximum oxygen storage estimate estimated, and the storage amount target setting means applies forced oscillation to the oxygen storage amount target.

In another preferable aspect, the air-fuel ratio target setting means sets the target so as to gradually increase the amplitude of the controlled air-fuel ratio. In another preferable aspect, the air-fuel ratio target setting means sets the target so as to gradually prolong the cycle of the controlled air-fuel ratio.

In another preferable aspect, the apparatus further comprises storage amount target setting means for setting an oxygen storage amount target, and the storage amount target setting means sets a plurality of targets between a minimum and a maximum of the oxygen storage amount and sets a control target by switching among the targets.

In another preferable aspect, the air-fuel ratio target setting means sets the target of the controlled air-fuel ratio in a lean region immediately after cold starting or during low-load operation of the internal combustion engine. In another preferable aspect, the air-fuel ratio target setting means sets the target of the controlled air-fuel ratio in a rich region during high-load operation of the internal combustion engine. In still another preferable aspect, the air-fuel ratio target setting means sets an operation period of setting the target of the controlled air-fuel ratio in a rich region, before execution of cutting fuel into the internal combustion engine or before a stop of the internal combustion engine.

In another preferable aspect, the air-fuel ratio target setting means sets a gain of air-fuel ratio feedback control, based on the oxygen storage amount estimated by the oxygen storage amount estimating means or based on the maximum oxygen storage amount estimated by the maximum oxygen storage amount estimating means.

In a further preferable aspect, the apparatus further comprises catalyst deterioration detecting means for detecting deterioration of the exhaust purifying catalyst, based on output of the downstream exhaust air-fuel ratio detecting means provided when the controlled air-fuel ratio is controlled so that the oxygen adsorption/desorption amount goes into a range of an instantaneously occludable oxygen amount or instantaneously releasable oxygen amount in a nondeteriorated state of the exhaust purifying catalyst.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF PREFERRED EMBODIMENTS

Prior to the detailed description of each embodiment, the oxygen occlusion function of exhaust purifying catalyst will be described briefly.

Figure 1:
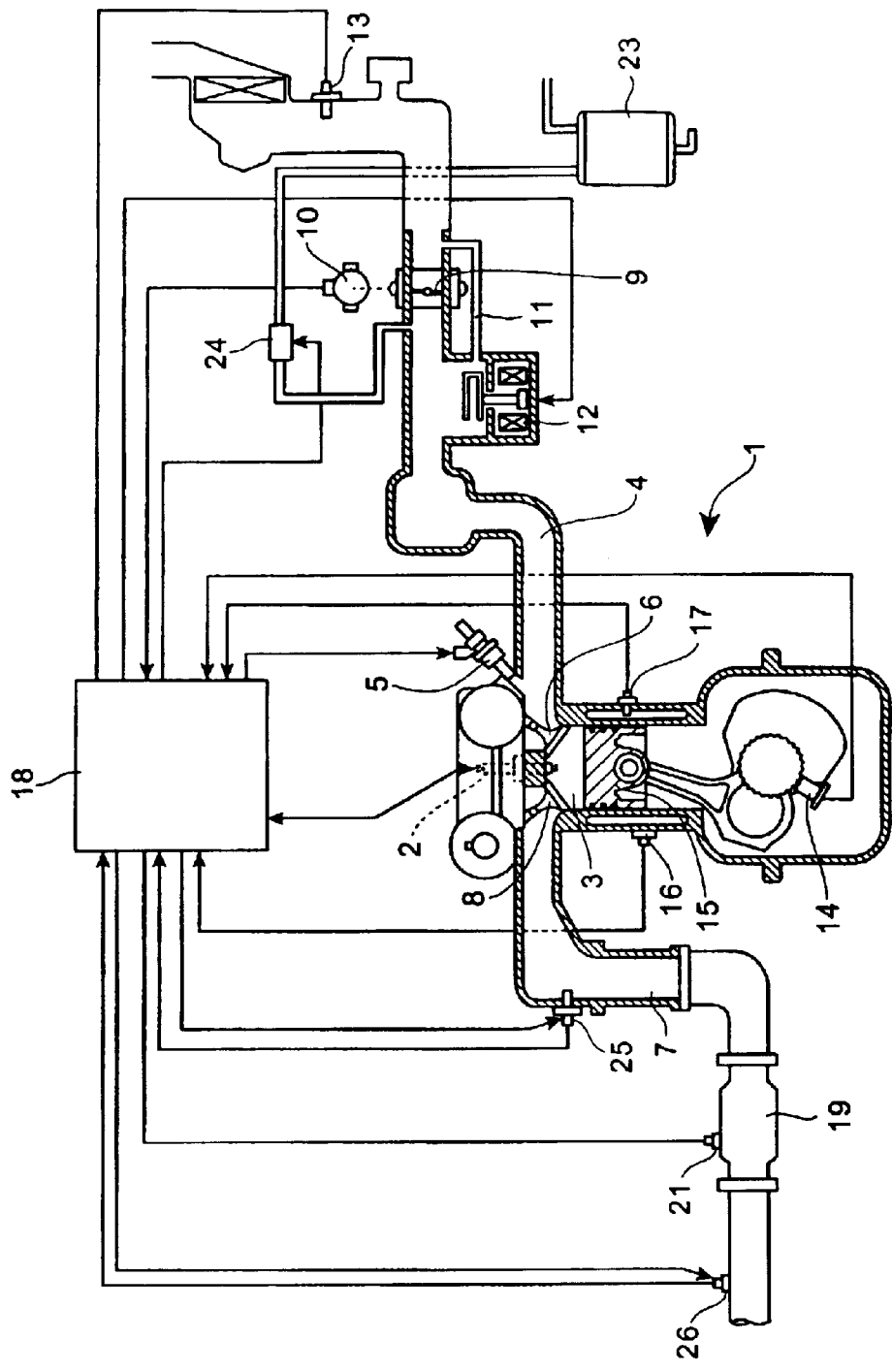
FIG. 1 is a cross-sectional view showing an internal combustion engine having an embodiment of the control apparatus of the present invention.

In each of the embodiments described below, as shown in FIG. 1, an exhaust purifying catalyst 19 is located on an exhaust path 7. In some types of cars a plurality of exhaust purifying catalysts are provided upstream and downstream on the exhaust path. Cars equipped with a multi-cylinder engine are sometimes provided with exhaust purifying catalysts located upstream of the position where exhaust pipes from respective cylinders are combined into one. For example, for an engine with four cylinders, an exhaust purifying catalyst is located at the position where exhaust pipes of two cylinders out of the four cylinders are combined into one and another exhaust purifying catalyst is located at the position where exhaust pipes of the two rest cylinders are combined into one. In the present embodiment, one exhaust purifying catalyst 19 is provided downstream of the position where the exhaust pipes of the respective cylinders 3 are combined into one.

In each of the following embodiments the exhaust purifying catalyst 19 is a three way catalyst having the oxygen occlusion function. This three way catalyst contains the component of ceria ($CeO_2$) and so on. For the sake of these component, it can occlude (adsorb) oxygen from the exhaust gas, and also can release oxygen into the exhaust gas.

This function of the three-way catalyst is the function of adsorbing and retaining excess oxygen existing in the exhaust gas at lean air-fuel ratios but releasing the thus adsorbed and retained oxygen at rich air-fuel ratios. During lean mixture periods the catalyst adsorbs excess oxygen to reduce nitrogen oxides NOx; whereas during rich mixture periods the oxygen adsorbed in the catalyst is released to oxidize CO and HC. In consequence, NOx, CO, and HC all are purified.

At this time, as described previously, if the three way catalyst occludes oxygen up to the limit of its oxygen occlusion capacity, it will be unable to occlude any more oxygen when the exhaust A/F turns lean, and the catalyst will fail to satisfactorily purify NOx in the exhaust gas. On the other hand, if the three-way catalyst completely releases oxygen so as to store no oxygen at all, it will be unable to release any more oxygen when the exhaust A/F turns rich, and it will fail to satisfactorily purify CO and HC in the exhaust gas. For this reason, it is preferable to maintain the oxygen storage amount ready for either lean or rich exhaust A/Fs.

In order to maintain the oxygen storage amount of the three way catalyst in a preferred range, it is necessary to accurately keep track of the storage amount of oxygen occluded in the three way catalyst. The oxygen storage amount is determined by gaining amounts of oxygen occluded and released based on the A/Fs and integrating the occluded amount and released amount. Namely, for accurately calculating the oxygen storage amount, it is necessary to obtain A/Fs accurately. It is also needless to mention that accurate A/F feedback control can also be performed with acquisition of accurate A/Fs.

Each of embodiments of A/F control apparatus according to the present invention will be described below and it is noted that the basic structure of A/F control apparatus and the fundamentals of control thereof are common to the embodiments. FIG. 1 shows an internal combustion engine equipped with an A/F control apparatus having this basic structure.

The control apparatus of the present embodiment controls the engine (internal combustion engine) 1. The engine 1 generates driving force by igniting the air-fuel mixture gas in each cylinder 3 by an ignition plug 2, as shown in FIG. 1. During combustion in the engine 1, air charged from the outside is guided through an intake path 4, and mixed with fuel injected from injector 5. Then air-fuel mixture gas is charged into each cylinder 3. An intake valve 6 opens or closes between the interior of each cylinder 3 and the intake path 4. The mixture after burnt inside each cylinder 3 is discharged as exhaust gas into the exhaust path 7. An exhaust valve 8 opens or closes between the interior of each cylinder 3 and the exhaust path 7.

A quantity of fuel contributing to combustion as supplied into each cylinder 3 does not always coincide with a quantity of fuel injected from the injector 5. Major factors of this discord include attachment of fuel onto the internal walls of cylinders 3 and intake ports or detachment from these internal walls. Namely, part of the fuel injected attaches onto the internal walls of the cylinders 3 and intake ports, and this attaching fuel is not burnt. On the other hand, the fuel having attached on the internal walls of the cylinders 3 and intake ports is peeled off therefrom and burnt on certain occasions.

A throttle valve 9 for controlling the intake air volume charged into the cylinders 3 is provided on the intake path 4. A throttle position sensor 10 for detecting a throttle angle of the throttle valve 9 is connected to the throttle valve 9. An air bypass valve 12 for adjusting the intake air volume of air supplied through a bypass line 11 into the cylinders 3 during idling (in a fully closed state of the throttle valve 9) is also provided on the intake path 4. Further, an air flow meter 13 for detecting the intake air flow is also mounted on the intake path 4.

A crank position sensor 14 for detecting the position of the crank shaft is mounted in the vicinity of the crank shaft of the engine 1. It is also feasible to determine the position of piston 15 in each cylinder 3 and the engine speed NE from output of the crank position sensor 14. The engine 1 is also provided with a knock sensor 16 for detecting knocking of the engine 1 and a water temperature sensor 17 for detecting the temperature of cooling water.

These ignition plugs 2, injectors 5, throttle position sensor 10, air bypass valve 12, air flow meter 13, crank position sensor 14, knock sensor 16, water temperature sensor 17, and other sensors are connected to an electronic control unit (ECU) 18 for totally controlling the engine 1, and are controlled based on signals from the ECU 18, or send their detection result to the ECU 18. Also connected to the ECU 18 are a catalyst temperature sensor 21 for measuring the temperature of the exhaust purifying catalyst 19 disposed on the exhaust path 7 and a purge control valve 24 for purging evaporative fuel from the interior of the fuel tank, collected by a charcoal canister 23, onto the intake path 4.

Also connected to the ECU 18 are an upstream A/F sensor 25 mounted upstream of the exhaust purifying catalyst 19 and a downstream A/F sensor 26 mounted downstream of the catalyst 19. The upstream A/F sensor 25 is a linear A/F sensor for linearly detecting the exhaust A/F from the oxygen content in the exhaust gas at the mount position. The downstream A/F sensor 26 is an oxygen sensor for detecting the exhaust A/F on an on-off basis from the oxygen content in the exhaust gas at the mount position. Since these A/F sensors 25, 26 cannot perform accurate detection below a predetermined temperature (activation temperature), they are heated by electrical power supplied from the ECU 18 so as to increase the temperature thereof to the activation temperature in the early stage.

The ECU 18 incorporates a CPU for execution of arithmetics, RAM(s) for saving various information contents such as results of arithmetics and others, backup RAM(s) contents of which are retained by a battery, ROM(s) for storing respective control programs, and so on. The ECU 18 controls the engine 1, based on A/F, and calculates the storage amount of oxygen occluded in the exhaust purifying catalyst 19. The ECU 18 also calculates the injection quantity of fuel injected from the injectors 5 and determines deterioration of the exhaust purifying catalyst 19 from the history of oxygen storage amount. Namely, the ECU 18 controls the engine 1, e.g., based on the exhaust A/F detected and the oxygen storage amount calculated.

The fundamental control will be described below as to the feedback control of maintaining the oxygen storage amount of the exhaust purifying catalyst 19 at favorable values and the deterioration detection control of the exhaust purifying catalyst 19 with use of the history of oxygen adsorption/desorption amounts by the A/F control apparatus described above.

After the description of the fundamental control described below, each control in each embodiment will be detailed. But it is noted that each control may be slightly different from the fundamental control described below. The control of oxygen storage amount described herein will be explained as a foundation of these. Portions different from this foundation control in each control example of each embodiment will be described in detail in description of each control example. For facilitating the description, an example of temporal changes in respective controlled variables in this fundamental control is presented in FIG. 2.

The oxygen storage amount O2SUM is obtained by estimating an oxygen A/D (adsorption/desorption) amount O2AD of the exhaust purifying catalyst 19 from the exhaust air-fuel ratio AF upstream of the exhaust purifying catalyst 19, detected by the upstream A/F sensor 25, and integrating it (i.e., by using the history). Let us assume here that the exhaust purifying catalyst 19 occludes oxygen during periods of the oxygen A/D amount O2AD being positive but the exhaust purifying catalyst 19 releases oxygen during periods of the oxygen A/D amount O2AD being negative. First, the calculation of the oxygen storage amount O2SUM will be described on the basis of the flowchart shown in FIG. 3.

In this case, the oxygen storage amount O2SUM is calculated with respect to a datum point (O2SUM=0) at a certain point of time (e.g., at the time of activation of ignition). Namely, the oxygen storage amount O2SUM increases during occlusion of oxygen into the exhaust purifying catalyst 19, but decreases during release thereof.

First, the exhaust A/F AF of input gas into the exhaust purifying catalyst 19 is detected by the upstream A/F sensor 25. The intake air flow Ga is also detected by the air flow meter 13. The oxygen A/D amount O2AD of oxygen occluded into or released from the exhaust purifying catalyst 19 is calculated from these intake air flow Ga and exhaust A/F AF, injected fuel quantity, and so on (step 100). This oxygen A/D amount O2AD can be obtained using a map in the ECU 18 or calculated using a calculation formula saved in the ECU 18.

After step 100, it is determined whether a lean flag Xlean of downstream exhaust A/F is on and whether the oxygen A/D amount O2AD calculated is positive (step 110). The lean flag Xlean and rich flag Xrich of the downstream exhaust A/F will be detailed later, but it is noted here that the lean flag Xlean is on with the downstream exhaust A/F being lean, while the rich flag Xrich is on with the downstream exhaust A/F being rich.

In step 110, when the lean flag Xlean of the downstream exhaust A/F is on, it is meant that the exhaust A/F of output gas from the exhaust purifying catalyst 19 is lean and the oxygen amount is surplus. When the oxygen A/D amount O2AD is positive, the present status can be said to be that the input gas into the exhaust purifying catalyst 19 contains oxygen that can be occluded (hereinafter referred to as occludable oxygen). Accordingly, when step 110 ends up with yes, though the input gas into the exhaust purifying catalyst 19 contains occludable oxygen, the exhaust purifying catalyst 19 is in a state in which it has already occluded oxygen to the limit and is able to occlude no more oxygen.

For this reason, when step 110 ends up with yes, this routine is immediately terminated, without updating the oxygen storage amount O2SUM of the exhaust purifying catalyst 19. If the oxygen storage amount O2SUM were updated in spite of yes in step 110, it would be assumed that the catalyst occluded oxygen that it was actually unable to occlude. Therefore, the update of the oxygen storage amount O2SUM is inhibited. When step 110 ends up with no, it is then determined whether the rich flag Xrich of the downstream exhaust A/F is on and whether the oxygen AID amount O2AD calculated is negative (step 120).

The status wherein the rich flag Xrich of the downstream exhaust A/F is on, means that the exhaust A/F of output gas from the exhaust purifying catalyst 19 is rich and the oxygen amount is insufficient. With the oxygen A/D amount O2AD being negative, it can be mentioned that the system is in such a state that the exhaust A/F of input gas into the exhaust purifying catalyst 19 is rich and that the exhaust gas is to be purified by releasing oxygen occluded in the exhaust purifying catalyst 19. Accordingly, when step 120 ends up with yes, though the input gas into the exhaust purifying catalyst 19 is in the state to be purified by oxygen released from the exhaust purifying catalyst 19, the exhaust purifying catalyst 19 is in a state in which it has already released all oxygen up and is unable to release any more oxygen.

For this reason, when step 120 ends up with yes, the oxygen storage amount O2SUM of the exhaust purifying catalyst 19 is not updated further more. If the oxygen storage amount O2SUM were updated with yes in step 120, it would be assumed that the catalyst released oxygen that it was actually unable to release. Therefore, the update of the oxygen storage amount O2SUM is inhibited in this way. When step 120 also ends up with no, the exhaust purifying catalyst 19 is neither in the state wherein it has already occluded oxygen fully in spite of the existence of occludable oxygen in the input gas nor in the state wherein it has already released oxygen fully in spite of the necessity for release of oxygen as described above. Therefore, the oxygen storage amount O2SUM is updated using the oxygen A/D amount O2AD calculated (step 130).

By updating the oxygen storage amount O2SUM, using the oxygen AID amount O2AD in this way (while the update is inhibited with yes in step 110 or in step 120), it is feasible to always estimate the amount of oxygen occluded in the exhaust purifying catalyst 19 accurately. The history of the oxygen storage amount O2SUM created in this way is illustrated in the upper part of the timing chart of FIG. 2. The oxygen storage amount O2SUM thus sequentially updated is saved in the ECU 18.

Next, calculation of maximum O2SUM max and minimum O2SUMmin of the oxygen storage amount O2SUM will be described on the basis of the flowchart shown in FIG. 4.

Since the oxygen storage amount O2SUM is based on the datum point at a certain point of time as described above, the maximum O2SUMmax and minimum O2SUMmin are also based on the datum point at this point of time in the present embodiment. At the point of time when the datum point (O2SUM=0) of the oxygen storage amount O2SUM is defined, O2SUMmax=0 and O2SUMmin=0.

Figure 2:
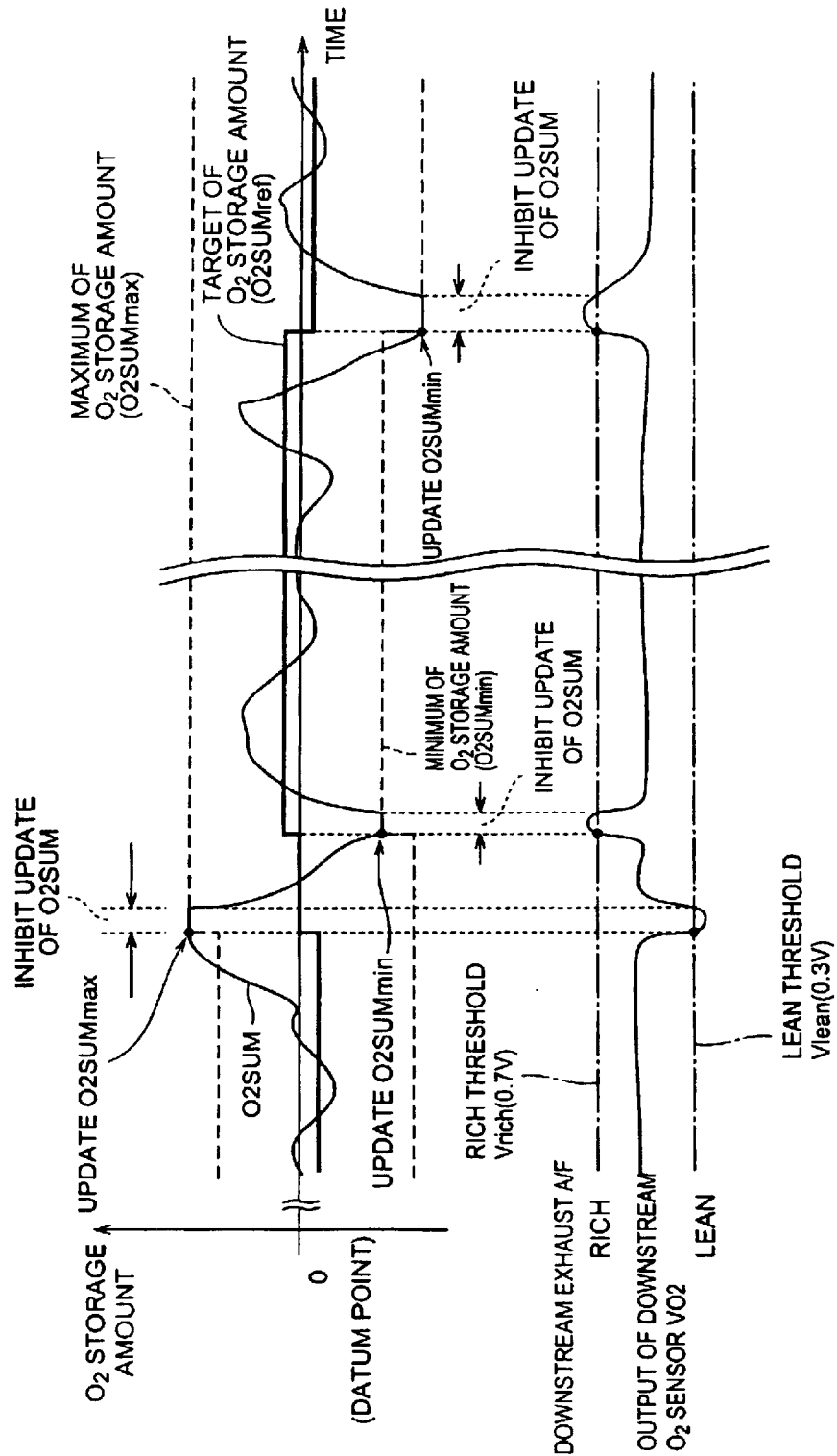
FIG. 2 is a timing chart showing change states of the oxygen storage amount O2SUM of the exhaust purifying catalyst, target thereof O2SUMref, and output of a downstream air-fuel ratio sensor.

First, as shown in the lower part in the timing chart of FIG. 2, it is determined whether the output voltage VO2 of the downstream A/F sensor 25 is less than a preset lean threshold Vlean (specifically, 0.3 V in this example) (step 200). When the output voltage VO2 is less than the lean threshold Vlean, the exhaust purifying catalyst 19 has already occluded oxygen up to the limit of oxygen occlusion capacity and is thus considered to be in a state in which it cannot occlude any more oxygen. For this reason, when step 200 ends up with yes, it is assumed that the oxygen storage amount O2SUM has reached the upper limit and the oxygen storage amount O2SUM at that time is saved as the maximum O2SUMmax in the ECU 18. As for the flags indicating the states of the downstream exhaust A/F of the exhaust purifying catalyst 19, the lean flag Xlean is set to on and the rich flag Xrich to off (step 210).

When step 200 ends up with no, it is determined whether the output voltage VO2 of the downstream A/F sensor 25 is over a preset rich threshold Vrich (specifically, 0.7 V herein) (step 220). When the output voltage VO2 is over the rich threshold Vrich, the exhaust purifying catalyst 19 stores no oxygen and is considered to be in a state in which it cannot release any more oxygen. For this reason, when step 220 ends up with yes, it is assumed that the oxygen storage amount O2SUM has reached the lower limit and the oxygen storage amount O2SUM at that time is saved as the minimum O2SUMmin in the ECU 18. As for the flags indicating the states of the downstream exhaust A/F of the exhaust purifying catalyst 19, the lean flag Xlean is set to off and the rich flag Xrich to on (step 230).

When step 220 ends up with no, the output voltage VO2 of the downstream A/F sensor 25 is between the lean threshold Vlean and the rich threshold Vrich (Vlean □ VO2 □ Vrich) and thus the exhaust A/F of output gas from the exhaust purifying catalyst 19 can be regarded as neither lean nor rich and as near the stoichiometric air-fuel ratio. In this case, the lean flag Xlean and rich flag Xrich are set both to off (step 240).

As described above, the history of oxygen storage amount O2SUM is sequentially updated and the maximum O2SUMmax and minimum O2SUMmin are updated based on this history and the output of the downstream A/F sensor 25. Therefore, the maximum oxygen amount that the exhaust purifying catalyst 19 can occlude (maximum oxygen storage amount) can be obtained by calculating the difference (O2SUMmax−O2SUMmin) between the maximum O2SUMmax and the minimum O2SUMmin. The maximum oxygen storage amount (O2SUMmax−O2SUMmin) of the exhaust purifying catalyst 19 varies depending upon the temperature of the exhaust purifying catalyst 19 and other factors, but it is always maintained at optimum, because the maximum O2SUMmax and minimum O2SUMmin are always updated.

Figure 5:
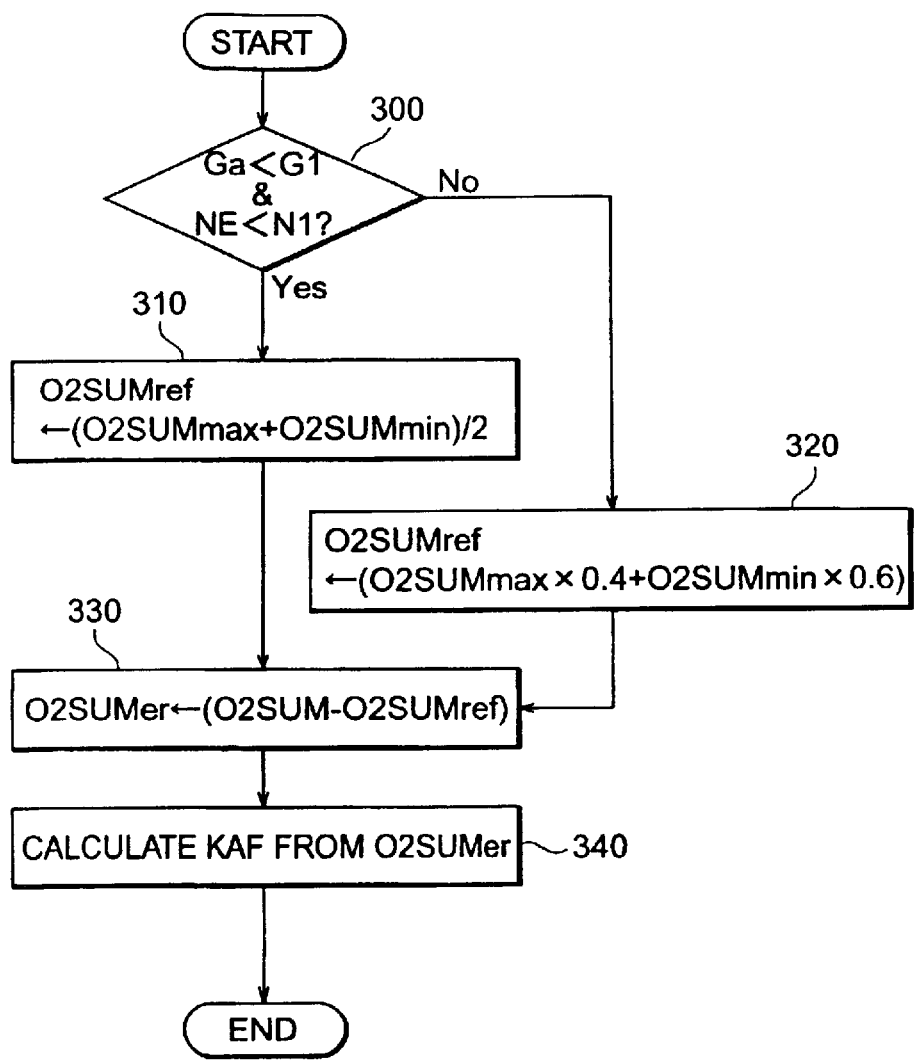
FIG. 5 is a flowchart showing update control of the target O2SUMref of the oxygen storage amount O2SUM and calculation of a correction factor KAF of injected fuel quantity.

The basic control of setting a target O2SUMref of the oxygen storage amount O2SUM from the foregoing maximum O2SUMmax and minimum O2SUMmin will be described below. The control of calculating a correction factor KAF used in control of fuel injection from this target O2SUMref will also be described below. The flowchart showing this control is presented in FIG. 5.

It is first determined whether the intake air flow Ga detected by the air flow meter 13 is less than a preset threshold G1 and whether the engine speed NE detected by the crank position sensor 14 is less than a preset threshold N1 (step 300). When step 300 ends up with yes, it can be judged that the engine 1 is operating in a low load region in the feedback control range of injected fuel quantity based on the oxygen storage amount O2SUM. In this case, the target O2SUMref of the oxygen storage amount O2SUM is set to an average (O2SUMmax+O2SUMmin)/2 of the maximum O2SUMmax and minimum O2SUMmin (step 310).

These arithmetic steps are carried out in the ECU 18. By setting the target O2SUMref in this way, an oxygen occlusion margin and an oxygen release margin of the exhaust purifying catalyst 19 can be made approximately equal to each other and the target is set in a state in which the catalyst is equally ready for both the oxygen occluding situation and the oxygen releasing situation.

On the other hand, when step 300 ends up with no, it can be judged that the engine 1 is operating in a high load region in the feedback control range of injected fuel quantity based on the oxygen storage amount O2SUM of the exhaust purifying catalyst 19. In this case, the target O2SUMref of the oxygen storage amount O2SUM is set to a value closer to the minimum O2SUMmin from the foregoing average (O2SUMmax+O2SUMmin)/2 (step 320). In this example, the target O2SUMref is calculated according to (O2SUMmax×0.4+O2SUMmin×0.6). The following will describe why the target O2SUMref is set to the value closer to the minimum O2SUMmin in the high load region in the feedback control range.

While the engine 1 is operating in this high load region, the amount of NOx in the exhaust gas is larger than during the operation in the low load region. For this reason, once the exhaust purifying catalyst 19 has occluded oxygen fully to go into the state capable of occluding no more oxygen, it will be harder to reduce NOx by the exhaust purifying catalyst 19, so that the catalyst will fail to purify NOx satisfactorily. For this reason, the oxygen occlusion margin of the exhaust purifying catalyst 19 is set larger in a high load region in the feedback control range (i.e., the target O2SUMref is set to the value closer to the minimum O2SUMmin), whereby the exhaust purifying catalyst 19 is prevented from occluding oxygen fully to go into the state capable of occluding no more oxygen and whereby NOx are purified securely.

After the target O2SUMref is set in step 310 or in step 320, the next step is carried out to calculate a deviation O2SUMer between the oxygen storage amount O2SUM and the target O2SUMref at that point (step 330). Then the correction factor KAF used in the control of fuel injection is determined from a map stored in the ECU 18, based on this deviation O2SUMer (step 340). By correcting the injected fuel quantity using this correction factor KAF, the oxygen storage amount O2SUM of the exhaust purifying catalyst 19 is feedback-controlled toward the target O2SUMref.

The injection quantity of fuel actually injected by the injectors 5 (or open time of the injectors 5) TAU is determined according to the following equation in the ECU 18.

$$TAU = TAUP \times KAF \times \alpha + \beta$$

In this equation TAUP represents a basic fuel injection quantity determined from the intake air flow Ga and the engine speed NE. The final fuel injection quantity TAU is determined by correcting this basic fuel injection quantity TAUP, using the foregoing correction factor KAF concerning the feedback control of oxygen storage amount O2SUM and other various correction factors $\alpha$, $\beta$. An A/F feedback factor FAF is well known as an example of the foregoing correction factors $\alpha$, $\beta$.

The intake A/F into the engine 1 is regulated by controlling this fuel injection quantity TAU. The detailed description of the factors a, P is omitted herein. By correcting the injected fuel quantity using the correction factor KAF in this way, the oxygen storage amount O2SUM of the exhaust purifying catalyst 19 is feedback-controlled toward the target O2SUMref.

In this example, since the history of oxygen storage amount O2SUM is updated with respect to the datum point (O2SUM=0) as the oxygen storage amount O2SUM at a certain point, the oxygen storage amount O2SUM can be positive or negative relative to this datum point. When the oxygen storage amount O2SUM is updated on the positive side and on the negative side and the target O2SUMref is set near the average of the maximum O2SUMmax and the minimum O2SUMmin, this target O2SUMref may be set near the datum point (O2SUM=0) and is kept from largely varying, which is preferable in terms of control.

Figure 6:
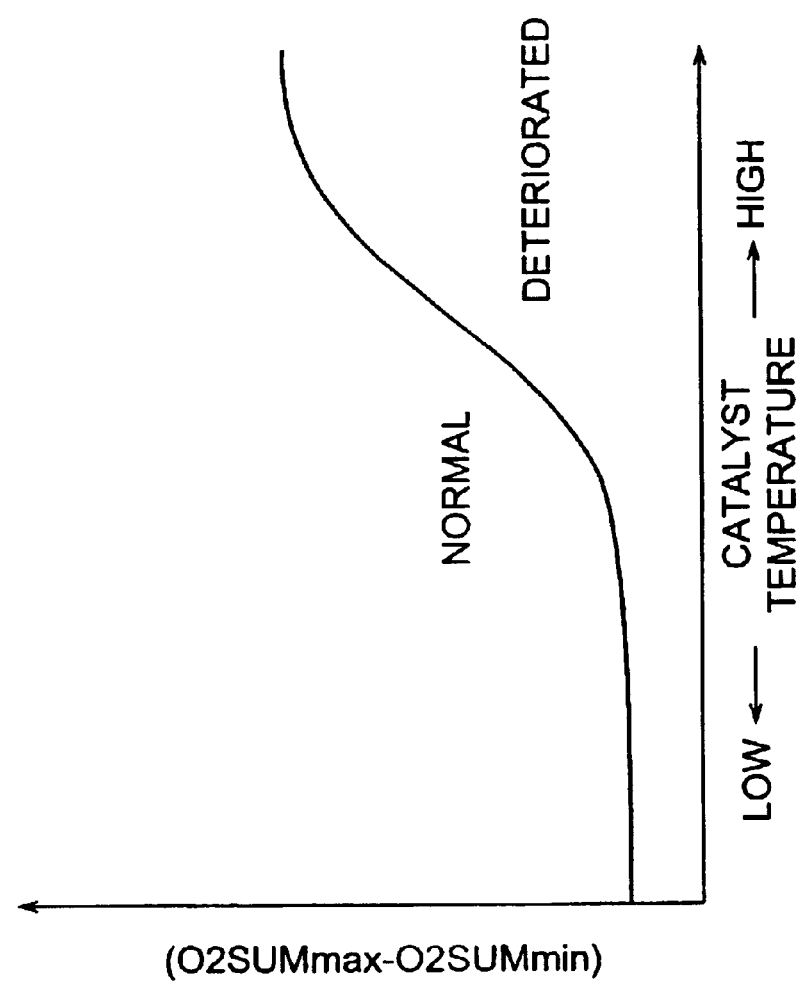
FIG. 6 is a map used for determination of deterioration of the exhaust purifying catalyst.

It is also feasible to perform determination of deterioration of the exhaust purifying catalyst 19, using the foregoing maximum O2SUMmax and minimum O2SUMmin. The maximum oxygen storage amount (O2SUMmax−O2SUMmin) of the exhaust purifying catalyst 19 will decrease because of the deterioration. And the maximum oxygen storage amount (O2SUMmax−O2SUMmin) at a certain point increases as the temperature thereof becomes higher. Therefore, a map is made as illustrated in FIG. 6, and the maximum oxygen storage amount (O2SUMmax−O2SUMmin) under a certain temperature is calculated and plotted in FIG. 6. If it is plotted in the region of "normal," it can be determined that the exhaust purifying catalyst 19 has not deteriorated yet. If it is plotted in the region of "deteriorated," it can be determined that the maximum oxygen storage amount (O2SUMmax−O2SUMmin) is lowered and the catalyst has deteriorated.

The ECU 18 and upstream A/F sensor 25 function as the oxygen storage amount estimating means for estimating the oxygen storage amount O2SUM and also function as the maximum oxygen storage amount estimating means for estimating the maximum oxygen storage amount (O2SUMmax−O2SUMmin). The downstream A/F sensor 26 functions as the downstream exhaust A/F detecting means. Further, the ECU 18 also functions as the A/F target setting means for setting the target of controlled A/F.

Now each of embodiments will be described below. The A/F control apparatus in either of the embodiments described below is provided with the oxygen storage amount estimating means, downstream exhaust A/F detecting means, maximum oxygen storage amount estimating means, and A/F target setting means. The oxygen storage amount estimating means estimates the oxygen storage amount O2SUM of the exhaust purifying catalyst 19, based on the history of oxygen A/D amount O2AD of the exhaust purifying catalyst 19 located on the exhaust path 7 of the internal combustion engine 1. The downstream exhaust A/F detecting means is located downstream of the exhaust purifying catalyst 19 and detects the exhaust A/F AF at the downstream position of the exhaust purifying catalyst 19. The maximum oxygen storage amount estimating means estimates the maximum oxygen storage amount (O2SUMmax−O2SUMmin), based on an oxygen storage amount estimate when the exhaust A/F AF detected is a predetermined A/F. This basic part is common to all the embodiments below.

First described is an embodiment in which the oxygen storage amount estimating means estimates the oxygen storage amount O2SUM, based on the quantity of fuel supplied into the cylinders 3, which is predicted by a fuel behavior model taking account of the fuel attaching onto the internal surfaces of the exhaust path of the internal combustion engine 1. In the present embodiment, the apparatus is further provided with the upstream exhaust A/F sensor 25 for detecting the upstream exhaust A/F upstream of the exhaust purifying catalyst 19 and the oxygen storage amount estimating means estimates the oxygen storage amount O2SUM in consideration of response delay of the upstream A/F sensor 25.

In the present embodiment, the fuel quantity expected to actually contribute to combustion is predicted according to a fuel behavior model and the oxygen storage amount O2SUM is accurately estimated based thereon. In addition thereto, the response delay of the upstream A/F sensor 25, which detects the upstream exhaust A/F upstream of the exhaust purifying catalyst 19, is taken into account, whereby the oxygen storage amount is estimated more accurately.

Figure 7:
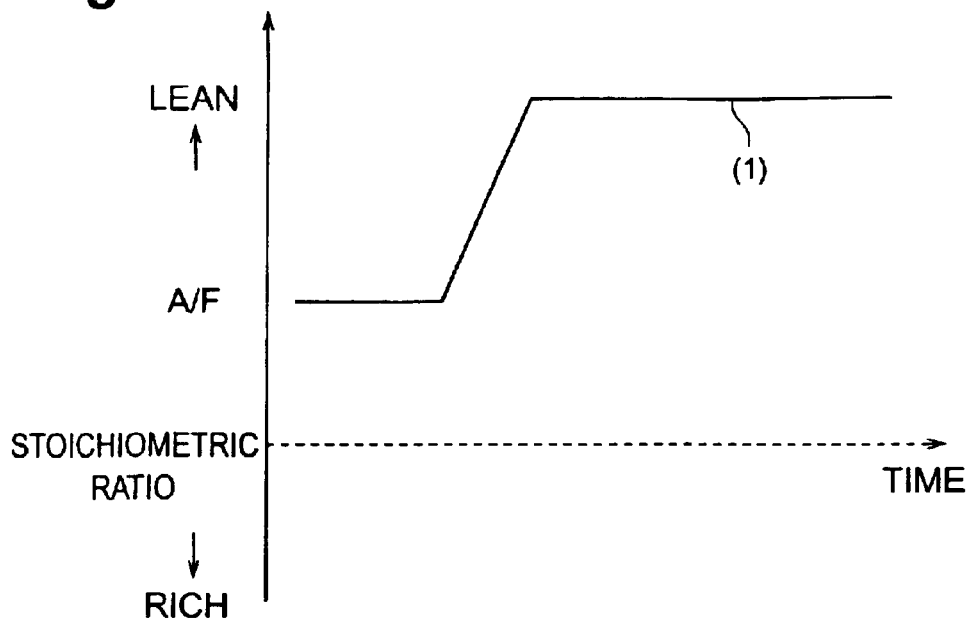
FIG. 7 is a graph showing predicted A/F value (1).

Referring to the graphs of FIG. 7 to FIG. 9, the outline of control by this control unit will be described below. As shown in FIG. 7, the A/F in the cylinders 3 is predicted (as predicted A/F value (1)) from various parameters of the engine 1. The air-fuel ratio (A/F) is a ratio of air to fuel. The volume of air can be detected as an intake air flow Ga by the air flow meter 13 (there is another way to detect it from the intake-pipe vacuum). On the other hand, as to the fuel quantity, all the fuel injected by the injectors 5 does not contribute to the combustion as it is, as described previously.

Thus the quantity of fuel actually contributing to combustion as supplied into the cylinders 3 (burnt fuel quantity) is calculated from the quantity of fuel injected by the injectors 5, in consideration of the quantity of fuel attaching onto the internal walls of the cylinders 3 and intake ports, the quantity of fuel peeling off among the fuel already attaching on the internal walls of the cylinders 3 and intake ports, and so on. The predicted A/F value (1) is calculated from the intake air flow Ga and the burnt fuel quantity. Here a model of behavior of fuel is made from the behavior of the fuel attaching on the internal surfaces of the intake path 4 and the fuel peeling off from the internal surfaces of the intake path 4 and will be called a fuel behavior model. As described above, the fuel quantity actually contributing to combustion (burnt fuel quantity) can be predicted from such a fuel behavior model.

Figure 8:
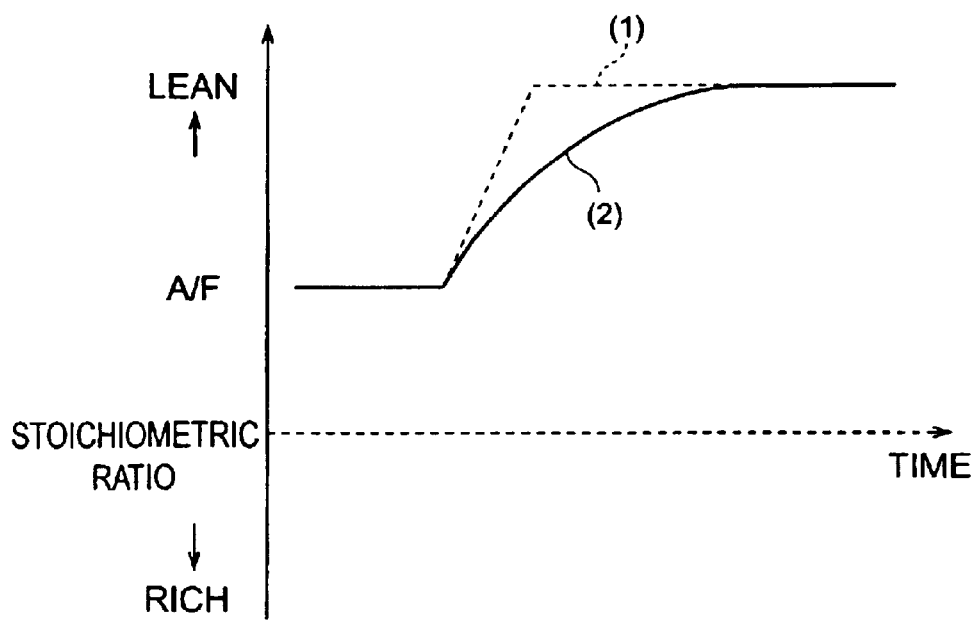
FIG. 8 is a graph showing predicted output value (2) and predicted A/F value (1).
Figure 9:
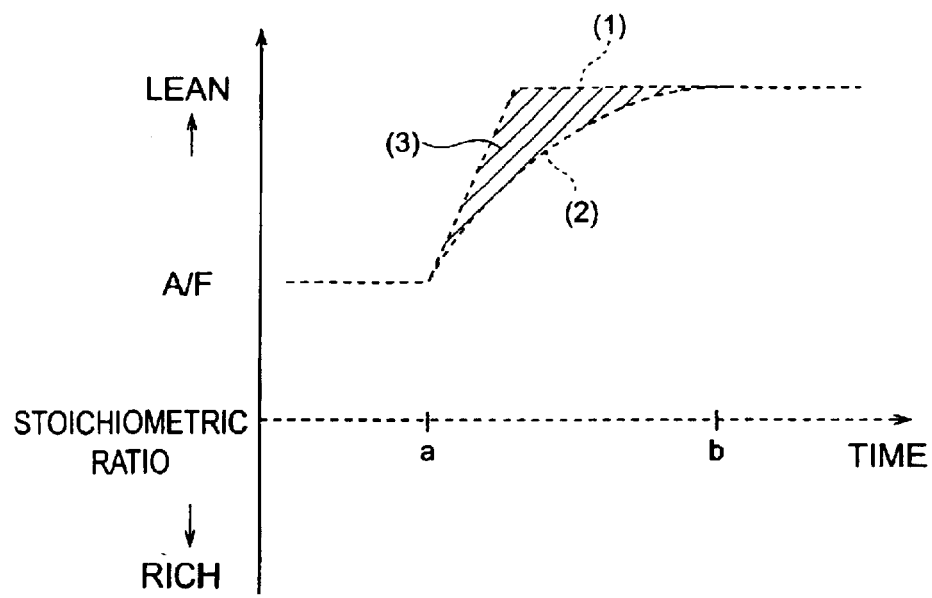
FIG. 9 is a graph showing detection error component (3), predicted output value (2), and predicted A/F value (1).

In the next place, as shown in FIG. 8, an output value expected to be outputted from the upstream A/F sensor 25 is predicted (as predicted output value (2)) from the predicted A/F value (1). The property of the upstream A/F sensor 25 can be preliminarily grasped about how the sensor acts. Then the predicted output value (2) is a predicted output as a detection result of the upstream A/F sensor 25 in consideration of the foregoing property of the upstream A/F sensor 25 when it is predicted that combustion takes place at the predicted A/F value (1).

The property of the upstream A/F sensor 25 is, for example, a response delay property. As far as the upstream A/F sensor 25 is a sensor, there is a limit to its response. This property produces an error in output of the sensor, but this property can be preliminarily grasped as a property intrinsic to the sensor. By taking this error into account, it is also feasible to obtain a value without the error from the actual sensor output.

In the present embodiment, however, the output value expected to be actually outputted from the sensor (predicted output value (2)) is predicted from the predicted value without error (predicted A/F value (1)) in consideration of the error specific to the sensor to the contrary. Here the detection error component (3) is obtained by calculating the difference between the predicted A/F value (1) and the predicted output value (2), as shown in FIG. 9. FIG. 7 to FIG. 9 show the example where the predicted A/F value (1) is leaner than the predicted output value (2), but the predicted A/F value (1) can also be richer than the predicted output value (2) in some cases. Namely, the detection error component (3) can be either positive or negative.

Figure 10:
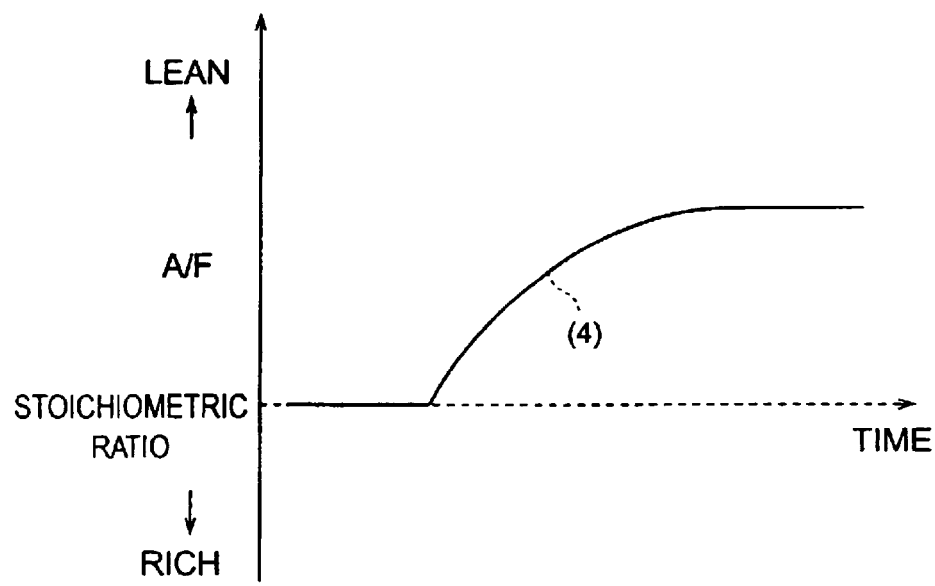
FIG. 10 is a graph showing exhaust A/F (4).
Figure 11:
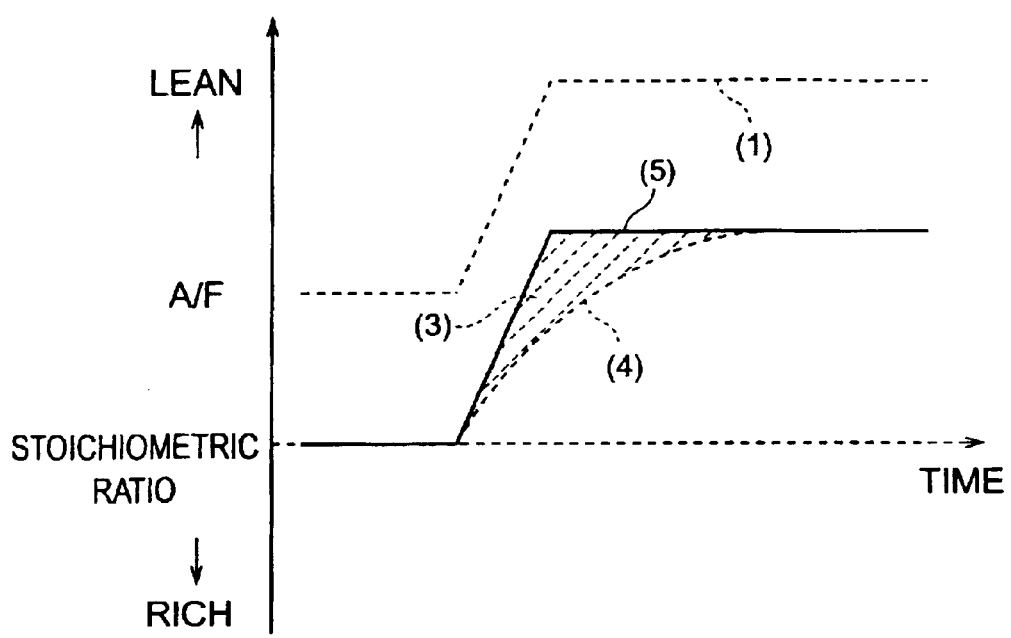
FIG. 11 is a graph showing corrected A/F (5), exhaust A/F (4), detection error component (3), and predicted A/F value (1).

On the other hand, as shown in FIG. 10, the upstream A/F sensor 25 also detects the exhaust A/F (4) of the exhaust gas flowing into the exhaust purifying catalyst 19, in parallel to the foregoing calculation of predicted A/F value (1), predicted output value (2), and detection error component (3). The exhaust A/F (4) detected includes the detection error of the upstream A/F sensor 25. Then the detection error component (3) is added to this detected exhaust A/F (4) as shown in FIG. 11, whereby a corrected A/F (5) can be obtained based on the correction by the error component. Since the detection error component (3) can not be only positive but also be negative as described previously, there are also actual cases wherein the detection error component (3) is subtracted from the exhaust A/F (4).

This corrected A/F (5) can be regarded as a true A/F based on the correction by the detection error component of the upstream A/F sensor 25. When the A/F feedback control is carried out according to this corrected A/F (5), it is feasible to further reduce the evolution of nitrogen oxides NOx, carbon monoxide CO, and hydrocarbons HC in the exhaust gas. By purifying the nitrogen oxides NOx, carbon monoxide CO, and hydrocarbons HC in the exhaust gas while making use of the foregoing oxygen occlusion function of the exhaust purifying catalyst 19, the oxygen storage amount of the exhaust purifying catalyst 19 can be accurately calculated using this corrected A/F (5) and the nitrogen oxides NOx, carbon monoxide CO, and hydrocarbons HC in the exhaust gas can be purified more effectively.

The predicted A/F value (1) and the corrected A/F (5) can discord from each other. This is because the predicted A/F value (1) is the air-fuel ratio of the mixture in the cylinders 3 while the corrected A/F (5) is the air-fuel ratio of the exhaust gas flowing into the exhaust purifying catalyst 19, because there is a detection error of intake air flow, and so on. However, since the detection error component (3) is quantitatively obtained as the difference between the predicted A/F value (1) and the predicted output value (2) and then is applied, the difference between the predicted A/F value (1) and the corrected A/F (5) as described will pose no problem.

In the control described above, the detection error component (3) may be applied to the exhaust A/F (4) after completion of the entire calculation throughout the range of the period a to b (see FIG. 9), but it may be applied to the exhaust A/F (4) in order as calculated from the time a. Namely, in this latter case, the calculation process of the detection error component (3) and the application process of the calculated detection error component (3) to the exhaust A/F (4) are carried out in parallel in the period a to b.

The predicted A/F value (1), predicted output value (2), and detection error component (3) are predicted with attention on the combustion in the cylinders 3, whereas the exhaust A/F (4) and corrected A/F (5) concern the exhaust gas flowing into the exhaust purifying catalyst 19. For this reason, a time lag due to movement of the exhaust gas from the cylinders 3 to the exhaust purifying catalyst 19 can be reflected between the predicted A/F value (1) and the corrected A/F (5).

Figure 12:
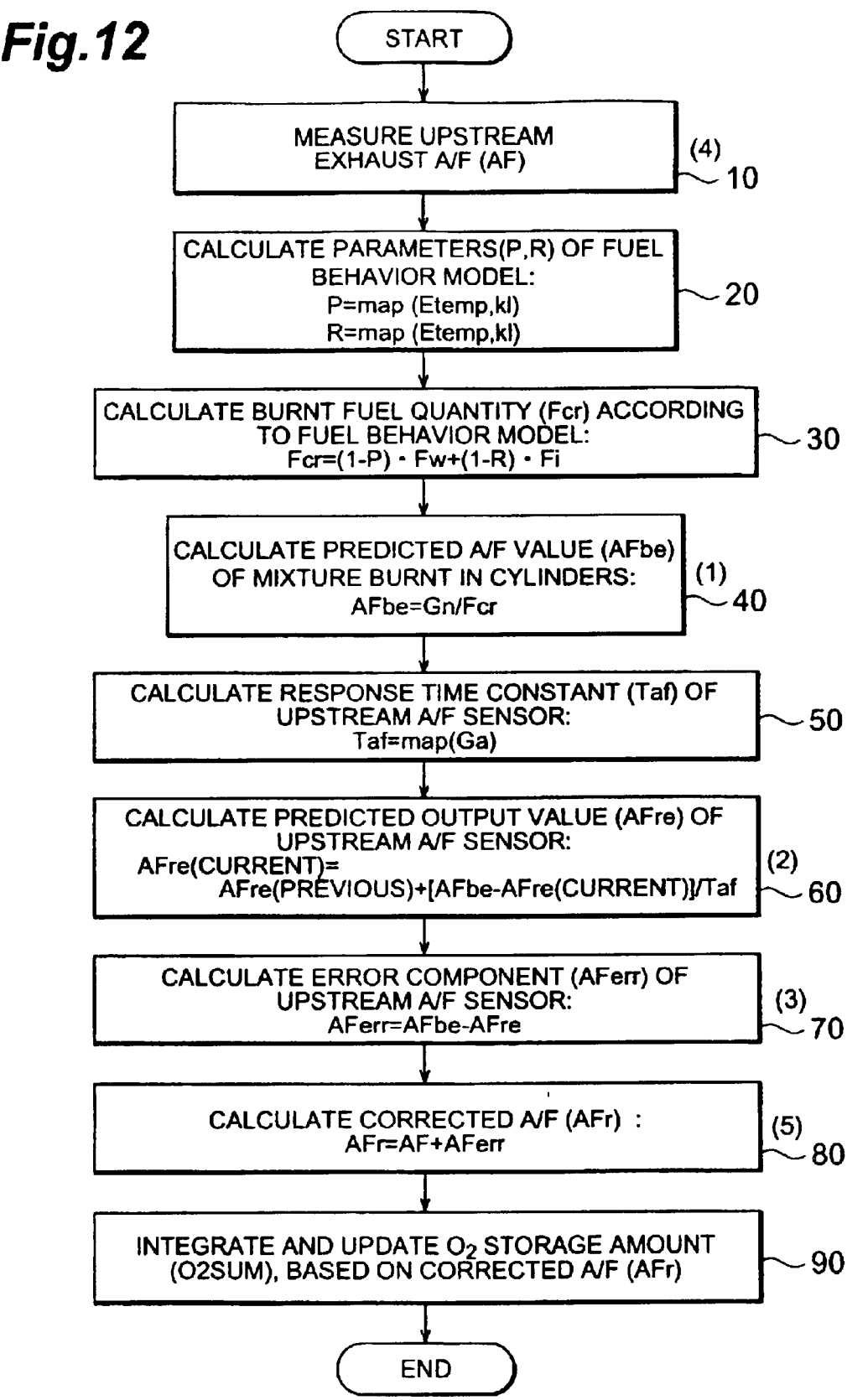
FIG. 12 is a flowchart of control based on the corrected A/F (5), exhaust A/F (4), detection error component (3), predicted output value (2), and predicted A/F value (1).

The above-stated control will be described below, based on the flowchart shown in FIG. 12.

The following provides meanings of respective symbols in the description below.

AFbe: predicted A/F value (1) (burnt A/F in the cylinders 3)

AFre: predicted output value (2) (predicted output value from the sensor, based on (1))

AFerr: detection error component (3) (predicted detection error value of the sensor)

AF: exhaust A/F (4) (output value of the sensor upstream of the catalyst)

AFr: corrected A/F (5) (corrected A/F upstream of the catalyst)

Etemp: engine temperature (temperature at the internal walls of the cylinders and ports)

KL: load factor (%)

Fcr: burnt fuel quantity

Fw: attaching fuel quantity

P: residual percentage of attaching fuel

Fi: injected fuel quantity

R: attachment percentage of injected fuel

Gn: intake air volume (g/rev)

Ga: intake air flow (g/sec)

Taf: response time constant of the A/F sensor

First, the upstream A/F sensor 25 detects the A/F of the exhaust gas upstream of the exhaust purifying catalyst 19, i.e., the exhaust A/F (4) and it is temporarily saved, e.g., in the RAM in the ECU 18 [step 10]. Then the parameters P, R are determined based on the foregoing fuel behavior model in order to calculate the burnt fuel quantity Fcr [step 20]. In the present embodiment the fuel behavior model is determined in consideration of the foregoing fuel attachment and peeling-off of attaching fuel. The fuel behavior model for the prediction of burnt fuel quantity may further involve the behavior of the fuel except for the attaching and peeling fuel.

The foregoing parameters P, R concern the attaching and peeling fuel and the parameter P indicates what percentage of fuel remains attaching without being peeled off among the already attaching fuel. Namely, the parameter P indicates the residual percentage of attaching fuel and (1−P) indicates a rate of peeling fuel contributing to combustion among the already attaching fuel. On the other hand, the parameter R indicates what percentage of fuel attaches onto the internal walls of the cylinders 3 and intake ports among the fuel injected by the injectors 5. Namely, the parameter R is the attachment percentage of injected fuel and (1−R) represents a rate of fuel contributing to combustion without attaching onto the internal walls of the cylinders 3 and intake ports.

These parameters P, R are determined from the engine temperature Etemp and the load factor KL. The engine temperature Etemp is used as a temperature representing those at the internal walls of the cylinders 3 and intake ports. The reason is that the fuel attachment amount and fuel peeling amount largely depend upon the temperatures at the internal walls of the cylinders 3 and intake ports. The engine temperature Etemp is determined from the detection result of the water temperature sensor 17 herein. The load factor KL is determined from the rate of intake air flow to maximum intake air flow. The ECU 18 has a map concerning these parameters P, R and determines the parameters P, R according to the map, based on the detected engine temperature Etemp and load factor KL.

Then the ECU 18 calculates the burnt fuel quantity Fcr actually contributing to the combustion in the cylinders 3, using the parameters P, R thus calculated [step 30]. It is calculated using Equation [Fcr=(1−P)□Fw+(1−R)Fi]. Here the attaching fuel quantity Fw is obtained by integration using the prior injected fuel quantity Fi and parameter R (attachment percentage). Since the ECU 18 controls the injectors 5, the ECU 18 itself keeps track of the injected fuel quantity Fi.

Then the ECU 18 calculates the predicted A/F value AFbe (1) of the mixture burnt in the cylinders 3 from the burnt fuel quantity Fcr calculated and the intake air flow detected by the air flow meter 13 [step 40]. The intake air flow Gn used herein is the volume of air per combustion. The predicted A/F value AFbe is calculated using Equation [AFbe=Gn/Fcr]. Through this step, the air-fuel ratio of the mixture actually burnt in the cylinders 3 is predicted as the predicted A/F value AFbe (1).

Then the ECU 18 calculates the response time constant Taf of the upstream A/F sensor 25 [step 50]. This response time constant Taf is determined from the intake air flow. The engine intake air flow is detected by the air flow meter 13 and the intake air flow Ga used herein is the quantity of air per unit time (sec) (in units of g/sec). The ECU 18 has a map concerning the response time constant Taf and determines the response time constant Taf according to the map, based on the intake air flow Ga detected.

Next, the ECU 18 calculates the predicted output value AFre (2) of the upstream A/F sensor 25, using the above-stated response time constant Taf [step 60]. In the present embodiment the error property due to the response delay is taken into account as the property of the upstream A/F sensor 25. For this reason, the response time constant Taf is used to predict the output including the response delay in the detection of the predicted A/F value AFbe (1) by the upstream A/F sensor 25. The predicted output value is calculated using Equation [AFre(current value)=AFre(previous value)+{AFbe−AFre(current value)}/Taf].

Then the ECU calculates the detection error component AFerr (3) of the upstream A/F sensor 25 from the foregoing, predicted A/F value AFbe (1) and predicted output value AFre (2) [step 70]. In the present embodiment, since the detection error property due to the response delay is taken into account as the property of the upstream A/F sensor 25 as described above, the detection error component AFerr (3) in the present embodiment can also be said as a response delay component. The detection error component is calculated using Equation [AFerr=AFbe−AFre].

Then the ECU corrects the exhaust A/F (4) detected by the upstream A/F sensor 25, using the detection error component AFerr (3), to calculate the corrected A/F AFr (5) [step 80]. The exhaust A/F (4) detected by the upstream A/F sensor 25 includes the aforementioned error due to the response delay and this error component can be assumed to be calculated as the detection error component AFerr (3). Thus the corrected A/F AFr (5) is calculated using Equation [AFr=AF+AFerr] from the detection error component AFerr (3) and the exhaust A/F (4). This permits the air-fuel ratio without the error associated with the exhaust gas flowing into the exhaust purifying catalyst 19 to be obtained as the corrected A/F AFr (5).

Using the corrected A/F AFr (5) based on the correction by the error component, the control based on A/F such as the A/F feedback control is effected on the engine 1, whereby nitrogen oxides NOx, carbon monoxide CO, and hydrocarbons HC in the exhaust gas can be controlled well. Then the ECU determines the amount of oxygen occluded or released (i.e., adsorbed or desorbed) into or out of the exhaust purifying catalyst 19, based on the corrected A/F AFr (5) thus calculated, and this oxygen adsorption/desorption (A/D) amount is integrated (i.e., the history of oxygen A/D amount is used), whereby the oxygen storage amount of oxygen occluded in the exhaust purifying catalyst 19 can be grasped accurately [step 90]. This enables the oxygen occlusion function to be effectively utilized, thereby permitting more effective purification of nitrogen oxides NOx, carbon monoxide CO, and hydrocarbons HC in the exhaust gas.

As described above, the more accurate A/F during combustion is predicted as the predicted A/F value AFbe (1) herein and from this predicted A/F value AFbe (1) and the property of the upstream A/F sensor 25 (the property such as the response delay), it is predicted as the predicted output value AFre (2) what output will be given from the upstream A/F sensor 25 if combustion is actually done at the predicted A/F value AFbe (1). Further, the difference between the predicted A/F value AFbe (1) and the predicted output value AFre (2) is obtained as the detection error component AFerr (3) and this is added to the exhaust A/F (4) as the actual output of the upstream A/F sensor 25 to calculate the corrected A/F AFr (5).

Through this operation, the air-fuel ratio of the exhaust gas flowing into the exhaust purifying catalyst 19 is obtained more accurately as the corrected A/F AFr (5), whereby the control can be performed with better response. Namely, the present embodiment permits the control to be performed with excellent response, different from the configuration wherein the response delay is compensated for based on change in the output of the upstream A/F sensor 25.

In this embodiment the ECU 18 compares the predicted output value AFre (2) with the exhaust A/F (4), thereby learning the property of the upstream A/F sensor 25. This property of the upstream A/F sensor 25 is used in calculation of the predicted output value AFre (2) and needs to be preliminarily matched therewith. However, it finely changes with a lapse of time. The property can also possibly change because of deposits temporarily attaching on the upstream A/F sensor 25. Then the aforementioned learning is conducted in order to maintain the matching with such change of the property. This permits the property of the upstream A/F sensor 25 to always maintain accurate matching, whereby the engine 1 can be controlled with accuracy.

In this embodiment the ECU further determines the deterioration of the upstream A/F sensor 25, using the learned value obtained as a result of the learning about the property of the upstream A/F sensor 25. The learned value about the property of the upstream A/F sensor 25 reflects the relation between the predicted output and the actual output. When the upstream A/F sensor 25 deteriorates, a state of the deterioration is reflected in the learned value. Namely, the state of deterioration of the upstream A/F sensor 25 can be determined from the learned value.

In the present embodiment the oxygen storage amount was estimated by use of the fuel behavior model and the A/F sensors 25, 26 in order to take account of the response delay of the A/F sensors 25, 26 (especially, of the upstream A/F sensor 25). The present embodiment, however, also involves a case in which the oxygen storage amount is estimated without use of such means for actually detecting A/F. In this case, it is contemplated that the oxygen storage amount is estimated from the exhaust A/F predicted based on the fuel behavior model. For example, the exhaust A/F is predicted from only various state quantities such as the cooling water temperature, exhaust gas temperature, intake air temperature, intake air flow, and injected fuel quantity, and the oxygen storage amount can be estimated based thereon.

Described next is an embodiment in which the oxygen storage amount estimating means estimates the oxygen storage amount, based on the passing gas flow rate of gas passing through the exhaust purifying catalyst. Another embodiment wherein the oxygen storage amount estimating means estimates the oxygen storage amount, based on the magnitude of A/F change of the internal combustion engine, will also be described along with the foregoing embodiment.

In the present embodiment, the oxygen storage amount is estimated further more accurately by taking account of the passing gas flow rate of gas passing through the exhaust purifying catalyst utilizing the oxygen occlusion capability. The oxygen storage amount is estimated further more accurately by taking account of the change range from the stoichiometric air-fuel ratio.

When the exhaust gas flowing into the exhaust purifying catalyst 19 is lean, the exhaust purifying catalyst 19 occludes oxygen to reduce nitrogen oxides NOx in the exhaust gas, as described above. On the other hand, when the exhaust gas flowing into the exhaust purifying catalyst 19 is rich, the exhaust purifying catalyst 19 releases oxygen to oxidize carbon monoxide CO and hydrocarbons HC in the exhaust gas. These reactions take place during passage of the exhaust gas through the exhaust purifying catalyst 19.

Here the passing speed becomes high at large passing gas flow rates of gas passing through the exhaust purifying catalyst 19 and there is a possibility that the exhaust gas passes through the exhaust purifying catalyst 19 before oxygen in the exhaust gas is fully used in the purification reaction. There is also the reverse case wherein the passing speed becomes high at large passing gas flow rates of gas passing through the exhaust purifying catalyst 19 and the exhaust gas yet unpurified passes through the exhaust purifying catalyst 19 though oxygen available for the purification of exhaust gas still remains in the exhaust purifying catalyst 19 (e.g., oxygen occluded at corners of the exhaust purifying catalyst 19 is harder to contribute to the purification reaction). These phenomena will be expressed as "blow-by" hereinafter.

The purification reaction rate and purification efficiency in the state of exhaust gas close to the stoichiometric air-fuel ratio are different from those in the sufficiently lean or rich state of exhaust gas. For this reason, there can also occur situations wherein the exhaust gas passes through the exhaust purifying catalyst 19 before the complete end of the reaction, depending upon the exhaust A/F, and wherein the catalyst fails to purify the exhaust gas well though the gas can be satisfactorily purified at different exhaust A/Fs. This phenomenon will also be expressed hereinafter as "blow-by."

With occurrence of blow-by, the oxygen A/D amount O2AD can possibly include an error and thus the oxygen storage amount O2SUM cannot be estimated accurately. Therefore, consideration is given to the passing gas flow rate Gb of gas passing through the exhaust purifying catalyst 19 and the A/F change range ΔAF on the occasion of calculating the oxygen storage amount O2SUM of oxygen occluded in the exhaust purifying catalyst 19 by use of the oxygen A/D amount O2AD. Specifically, on the occasion of the calculation of the oxygen A/D amount O2AD, the passing gas flow rate Gb in the exhaust purifying catalyst 19 is detected and a correction factor Kg according to this passing gas flow rate Gb is found from a map in the ECU 18.

In the present embodiment the passing gas flow rate Gb is detected from the intake air flow Ga detected by the air flow meter 13 and the aperture of the throttle valve 9 detected by the throttle position sensor 10. It can also be contemplated that a flowmeter dedicated for the detection of the passing gas flow rate Gb is located upstream of the exhaust purifying catalyst 19. The upstream A/F sensor 25 detects the exhaust A/F AF of exhaust gas flowing into the exhaust purifying catalyst 19 and the A/F change range ΔAF (=AFst−AF) is determined from the difference between the theoretical A/F AFst and the exhaust A/F AF. Then a correction factor Ka according to this A/F change range ΔAF is found from a map in the ECU 18.

Figure 13:
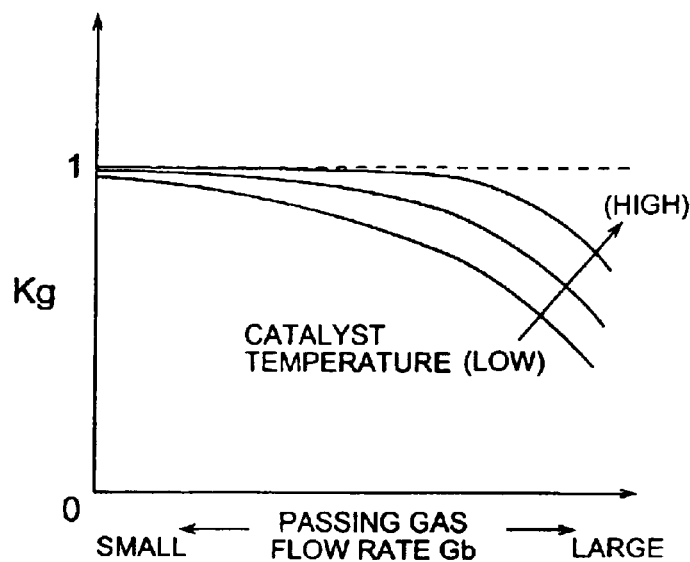
FIG. 13 is a map showing the relation between passing gas flow rate Gb and correction factor Kg.

A map showing the relation between the passing gas flow rate Gb and the correction factor Kg is presented in FIG. 13. A map showing the relation between the A/F change range ΔAF and the correction factor Ka is also presented in FIG. 14. The oxygen A/D amount O2AD is corrected according to the following equation.

O2AD (corrected value)←O2AD (calculated value)×*Kg*×*Ka*

Figure 3:
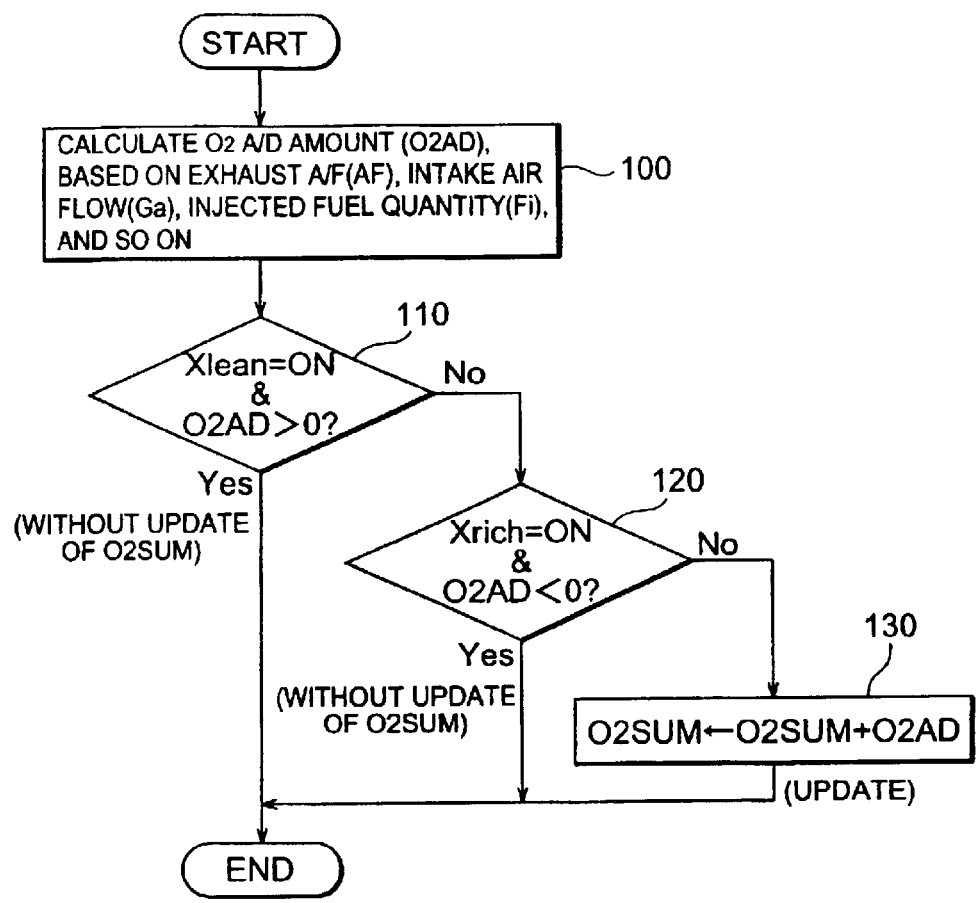
FIG. 3 is a flowchart of update control of the oxygen storage amount O2SUM.

This correction is preferably carried out immediately after step 100 of the flowchart shown in FIG. 3. The exhaust A/F AF for the calculation of the passing gas flow rate Gb and the A/F change range ΔAF is detected by reading in a measurement from each sensor immediately before the correction.

Figure 14:
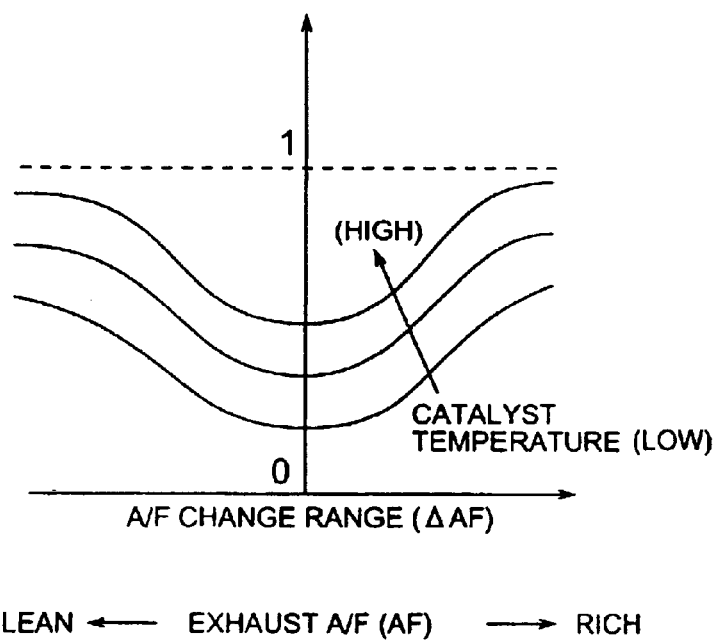
FIG. 14 is a map showing the relation between A/F change range $\Delta AF$ and correction factor Ka.

By using the oxygen A/D amount O2AD thus corrected, it is feasible to estimate the more accurate oxygen storage amount O2SUM. The oxygen A/D amount O2AD may be corrected more accurately with further consideration to the temperature of the exhaust purifying catalyst 19, as shown in FIG. 13 and FIG. 14. This permits the oxygen storage amount O2SUM to be estimated accurately, based on the accurate oxygen A/D amount O2AD. Since the oxygen storage amount O2SUM is estimated accurately, this configuration further includes such an aspect that the maximum oxygen storage amount (O2SUMmax−O2SUMmin) estimated therefrom becomes more accurate.

Next described is an embodiment in which the maximum oxygen storage amount estimating means further corrects the maximum oxygen storage amount estimated, based on the passing gas flow rate of gas passing through the exhaust purifying catalyst. Also described in connection therewith is an embodiment in which the maximum oxygen storage amount estimating means further corrects the maximum oxygen storage amount estimated, based on the magnitude of change of controlled A/F.

In the present embodiment, the maximum oxygen storage amount is estimated further more accurately by giving consideration to the passing gas flow rate of gas passing through the exhaust purifying catalyst making use of the oxygen storage capability. The maximum oxygen storage amount is also estimated further more accurately by giving consideration to the change range from the stoichiometric air-fuel ratio.

The foregoing embodiment using the correction factors Ka, Kg concerned the estimation of the oxygen storage amount O2SUM, whereas the present embodiment concerns the estimation of the maximum oxygen storage amount (O2SUMmax−O2SUMmin). Since the velocity is high at large passing gas flow rates, the oxygen occluded, e.g., at the corners of the exhaust purifying catalyst 19 is harder to contribute to the purification reaction of nitrogen oxides NOx, carbon monoxide CO, and hydrocarbons HC (or is resistant to release), as described previously. Further, it is harder for oxygen in the exhaust gas to be occluded at the corners and the like of the exhaust purifying catalyst 19, because the velocity is high at large passing gas flow rates. Namely, the maximum oxygen storage amount (O2SUMmax−O2SUMmin) of the exhaust purifying catalyst 19 can vary depending upon the passing gas amount.

Further, since the purification reaction rate and purification efficiency vary with variation in the exhaust A/F of exhaust gas as described above, the maximum oxygen storage amount (O2SUMmax−O2SUMmin) of the exhaust purifying catalyst 19 can be said to also vary depending upon the A/F change range of the engine 1. The present embodiment is an embodiment in which the maximum oxygen storage amount (O2SUMmax−O2SUMmin) is obtained more accurately by correcting and estimating the maximum oxygen storage amount (O2SUMmax−O2SUMmin) according to the passing gas rate of exhaust gas and the A/F change range of the engine 1.

The embodiment using the correction factors Ka, Kg has such an aspect that the estimation accuracy of the maximum oxygen storage amount (O2SUMmax−O2SUMmin) is raised as a result of the accurate estimation of the oxygen storage amount O2SUM. In contrast with it, the present embodiment enhances the estimation accuracy by directly correcting the maximum oxygen storage amount (O2SUMmax−O2SUMmin) according to the passing gas rate of exhaust gas and the A/F change range of internal combustion engine. These can be performed simultaneously and the simultaneous execution thereof can enhance the estimation accuracy more.

In the present embodiment the maximum oxygen storage amount (O2SUMmax−O2SUMmin) is corrected by correcting either one or both of the maximum O2SUMmax and the minimum O2SUMmin of the oxygen storage amount O2SUM. The correction is made using correction factors as in the case of the aforementioned embodiment using the correction factors Ka, Kg. Then these correction factors are prepared separately for correction of the maximum O2SUMmax and for correction of the minimum O2SUMmin and are stored in the ECU 18. The reason why the correction factors are prepared separately for correction of the maximum O2SUMmax and for correction of the minimum O2SUMmin is that more accurate correction is made by realizing different correction effects between the blow-by phenomenon on the oxygen occlusion side and the blow-by phenomenon on the oxygen release side (e.g., the reaction rate is made faster on the oxygen occlusion side).

Figure 15A:
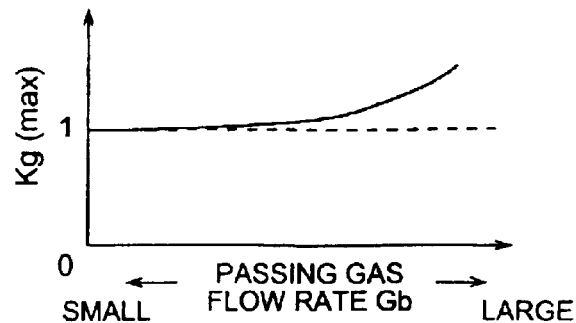
FIG. 15A is a map showing the relation between passing gas flow rate Gb and correction factor Kg(max).
Figure 15B:
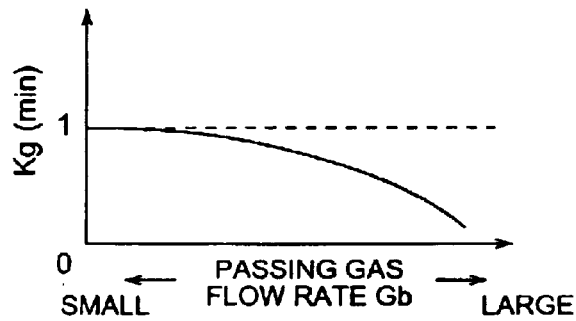
FIG. 15B is a map showing the relation between passing gas flow rate Gb and correction factor Kg(min).
Figure 16A:
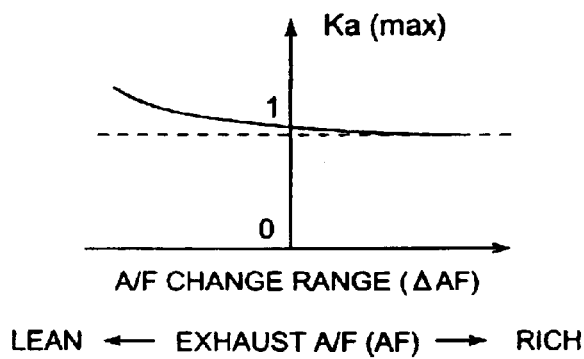
FIG. 16A is a map showing the relation between A/F change range $\Delta AF$ and correction factor Ka(max).
Figure 16B:
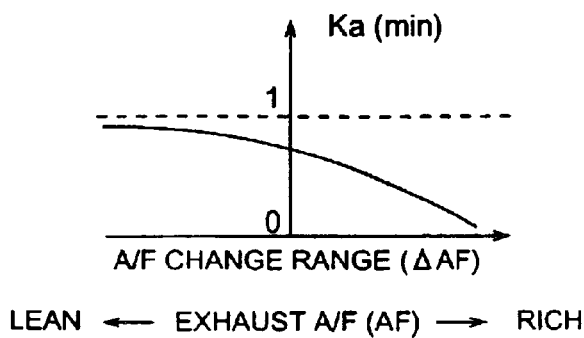
FIG. 16B is a map showing the relation between A/F change range $\Delta AF$ and correction factor Ka(min).

FIG. 15A shows a map indicating the relation between the passing gas flow rate Gb and the correction factor Kg(max) for correction of the maximum O2SUMmax, and FIG. 15B a map indicating the relation between the passing gas flow rate Gb and the correction factor Kg(min) for correction of the minimum O2SUMmin. FIG. 16A shows a map indicating the relation between the A/F change range ΔAF and the correction factor Ka(max) for correction of the maximum O2SUMmax and FIG. 16B a map indicating the relation between the A/F change range ΔAF and the correction factor Ka(min) for correction of the minimum O2SUMmin. Then either one or both of the maximum O2SUMmax and the minimum O2SUMmin are corrected according to the following equations.

$$O2SUMmax \text{ (corrected value)} \leftarrow O2SUMmax \text{ (calculated value)} \times Kg(max) \times Ka(max)$$

$$O2SUMmin \text{ (corrected value)} \leftarrow O2SUMmin \text{ (calculated value)} \times Kg(min) \times Ka(min)$$

Figure 4:
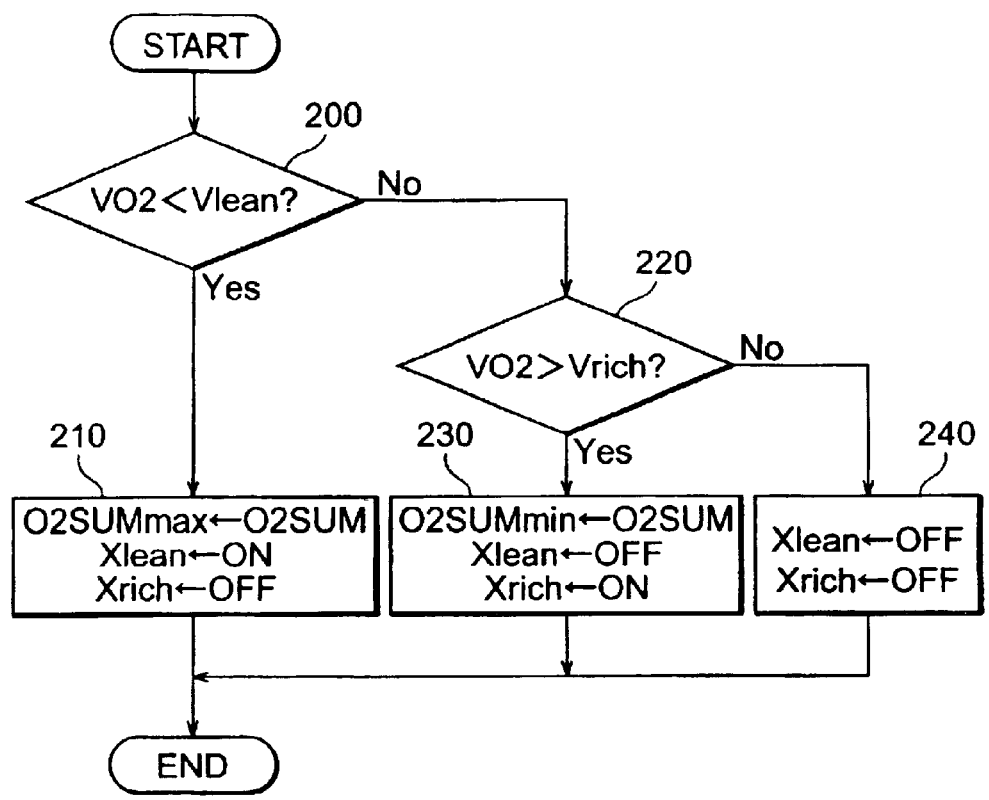
FIG. 4 is a flowchart showing update control of the maximum O2SUMmax and minimum O2SUMmin of the oxygen storage amount O2SUM.

This correction can be preferably implemented immediately after step 210 or step 230 in the flowchart shown in FIG. 4. The exhaust A/F AF for the calculation of the passing gas flow rate Gb and the A/F change range ΔAF is detected by reading in a measurement from each sensor immediately before the correction. The more accurate maximum oxygen storage amount (O2SUMmax−O2SUMmin) can be estimated by use of the maximum O2SUMmax and minimum O2SUMmin thus corrected.

Next described is an embodiment in which the oxygen storage amount estimating means estimates the oxygen storage amount, based on the composition of the exhaust gas flowing into the exhaust purifying catalyst, which is predicted according to a combustion model. Explained herein are an example in which the combustion model is modified based on the fuel quality and an example in which the combustion model is modified according to an operational state of the internal combustion engine.

In the present embodiment, the exhaust gas composition is predicted according to the combustion model of the internal combustion engine and the oxygen storage amount O2SUM is estimated based on the exhaust gas composition thus predicted. In the foregoing example the oxygen storage amount O2SUM was estimated based on the output of the upstream A/F sensor 25, whereas the oxygen storage amount O2SUM is estimated herein without actually detecting the exhaust A/F. By estimating the oxygen storage amount O2SUM, based on the combustion model, without depending upon the exhaust A/F as in this case, it is feasible to avoid the influence of error on the estimation of the oxygen storage amount O2SUM from the difference in the sensitivity characteristics of the A/F sensors 25, 26, the difference in the fuel quality, and so on.

It is, however, noted that the oxygen storage amount O2SUM can also be estimated more accurately when the oxygen storage amount O2SUM estimated without use of the combustion model nor detection of the exhaust A/F, is corrected using the output of the upstream A/F sensor 25 and the downstream A/F sensor 26. Alternatively, it can also be contemplated that an HC sensor for detecting the hydrocarbons (HC) in the exhaust gas and an NOx sensor for detecting the nitrogen oxides (NOx) are disposed upstream of the exhaust purifying catalyst 19 and the oxygen storage amount O2SUM estimated without use of the combustion model nor detection of the exhaust A/F is corrected using the output of those sensors.

Now let us describe below a technique of predicting the composition of the exhaust gas flowing into the exhaust purifying catalyst 19, based on the combustion model, and predicting the oxygen storage amount O2SUM from it. First, parameters of the combustion model are read in from the various sensors, control signals from the ECU 18, and so on. These parameters are, specifically, the intake air flow Ga, the burnt fuel quantity, the ignition timing, the exhaust A/F, EGR amount, intake turbulence intensity, the temperature of combustion chambers, the fuel quality, and so on. The burnt fuel quantity herein is the quantity of fuel actually contributing to the combustion in the cylinders 3, which is determined according to the foregoing fuel behavior model or the like. The exhaust A/F can be the actual exhaust A/F detected by the A/F sensor 25, 26 or the like, or one estimated from the fuel behavior model. Further, if a swirl control valve for controlling swirls in the cylinders 3 is provided, the intake turbulence intensity can be replaced by a controlled variable of the swirl control valve, for example.

The exhaust gas composition is estimated from these parameters and amounts of substances contributing to the oxidation-reduction reactions in the exhaust gas (i.e., affecting the oxygen storage amount O2SUM of the catalyst) are estimated based thereon. Namely, in the exhaust purifying catalyst 19, the reactions from Formula (a) to Formula (d) below take place to oxidize or reduce the substances in the exhaust gas, and amounts (moles m1 to m4) of the substances contributing to the oxidation-reduction reactions are estimated from the composition of the exhaust gas. In Formula (a), all the substances in the left side do not react, but only part of them react depending upon various conditions. The reaction rate at this time is reflected as a reaction factor k1. Likewise, the reaction rate in Formula (b) is reflected as a reaction factor k2, that in Formula (c) as a reaction factor k3, and that in Formula (d) as a reaction factor k4.

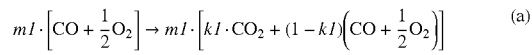

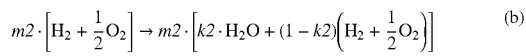

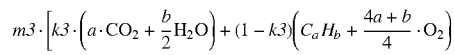

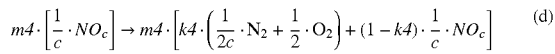

These reaction factors k1 to k4 are variably set according to the passing gas flow rate Gb, the exhaust gas temperature, the operating conditions of the engine 1, the state of the exhaust purifying catalyst 19, and so on. Formula (a) to Formula (c) represent the reactions to oxidize carbon monoxide, hydrogen, and hydrocarbons, using oxygen occluded in the exhaust purifying catalyst 19. Formula (d) represents the reaction to reduce nitrogen oxides, and oxygen evolved by the reduction is occluded in the exhaust purifying catalyst 19. Namely, the aforementioned oxygen A/D amount O2AD can be determined according to Formula (e).

Since the exhaust gas composition is determined based on the combustion model, the oxygen storage amount O2SUM of the exhaust purifying catalyst 19 can be estimated accurately corresponding to various operation conditions. The estimation of the oxygen A/D amount O2AD described above can be preferably implemented instead of step 100 shown in FIG. 3. The oxygen storage amount O2SUM and the maximum oxygen storage amount (O2SUMmax−O2SUMmin) are estimated based on this oxygen A/D amount O2AD. As described above, the exhaust gas composition and the exhaust A/F can also be determined by use of the combustion model, without provision of the A/F sensors (especially, without use of the upstream A/F sensor 25). However, since the combustion model can conceivably include an error, it is preferable to modify the combustion model according to the fuel quality and/or the operational state of the engine 1. It is also needless to mention that the aforementioned fuel behavior model can be used for the prediction of the combustion model.

Next described is an embodiment in which the detection result of the downstream exhaust A/F detecting means is corrected based on the composition of the exhaust gas flowing into the exhaust purifying catalyst. In the present embodiment the exhaust gas composition is predicted according to the combustion model.

In the description of the foregoing embodiment of estimating the oxygen storage amount, based on the gas composition predicted from the combustion model, we explained the correction of the combustion model by the output of the A/F sensor, for estimating the oxygen storage amount O2SUM. In contrast with it, the present embodiment is arranged to correct the output of the A/F sensors (especially, the downstream A/F sensor 26), based on the exhaust gas composition. The combustion model is also used herein for the prediction of the exhaust gas composition.

The A/F sensors 25, 26 detect the oxygen content in the exhaust gas, but can also sense components except for oxygen because of the structure thereof. For this reason, there will occur situations in which the detection accuracy of the oxygen content (A/F) is not satisfactory, depending upon the exhaust gas composition. Therefore, in order to predict the oxygen storage amount O2SUM more accurately, the output of the A/F sensors 25, 26 is corrected according to the exhaust gas composition. Another exhaust gas composition acquiring method except for the foregoing method of determining the exhaust gas composition from the combustion model is, for example, a method of determining the exhaust gas composition, based on output of the nitrogen oxide (NOx) sensor and the hydrocarbon (HC) sensor.

Figure 17:
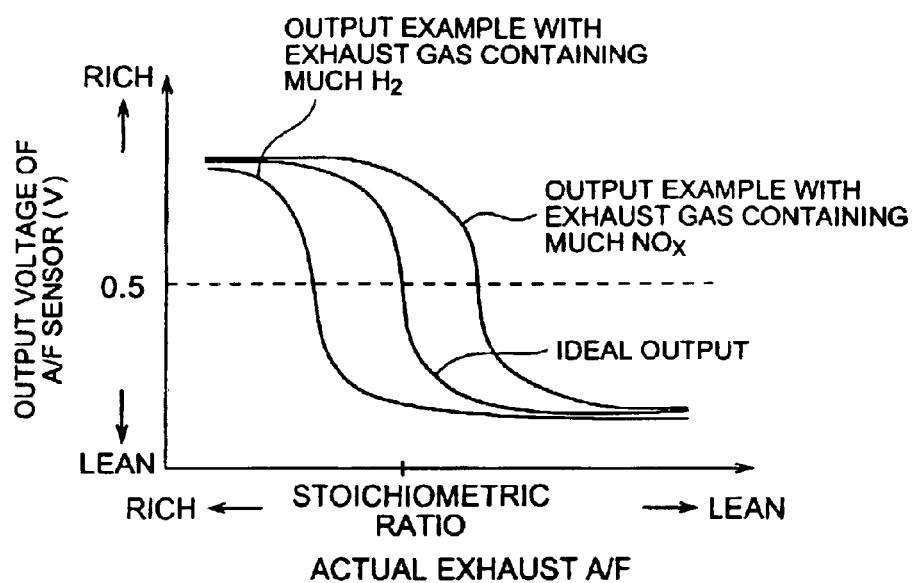
FIG. 17 is a graph showing the relation between actual exhaust A/F and output (voltage) of A/F sensor.

For example, ideal output of the A/F sensor for detecting the exhaust A/F on an on-off basis is one that suddenly changes its output signal, depending upon whether the exhaust A/F is lean or rich with respect to the border of the stoichiometric air-fuel ratio. However, there also exist the A/F sensors whose output is shifted from the ideal state with a large amount of nitrogen oxides (NOx) or hydrogen ($H_2$) in the exhaust gas, as shown in FIG. 17. For this reason, the exhaust gas composition is predicted or detected and the output of the A/F sensor is corrected based thereon. Since the combustion model was already described, the detailed description thereof is omitted herein. A preferred configuration is such that the exhaust gas composition is also predicted or detected in parallel to reading of the output of the A/F sensors 25, 26 and the correction is made immediately after the detection of the exhaust A/F by the A/F sensors 25, 26. It is also a matter of course that the aforementioned fuel behavior model can be used for the prediction of the combustion model.

Next described is an embodiment in which the A/F control apparatus is further provided with the abnormality determining means. The abnormality determining means determines whether the oxygen storage amount estimated is abnormal, based on the estimated oxygen storage amount and the detected downstream exhaust A/F. In the present embodiment, when the abnormality determining means determines that the estimated oxygen storage amount is abnormal, it deletes the history of oxygen storage amount heretofore, initiates new estimation of oxygen storage amount, and modifies the oxygen occlusion amount estimation model.

In the present embodiment, the abnormality determining means compares the output of the downstream A/F sensor 26 with the calculated oxygen storage amount O2SUM to determine whether the estimated oxygen storage amount O2SUM is abnormal (or whether the estimation model of oxygen storage amount O2SUM is abnormal). Here the ECU 18 also functions as the abnormality determining means for making a judgment. When the oxygen storage amount O2SUM is judged as abnormal, the oxygen storage amount O2SUM is corrected. Further, when the oxygen storage amount O2SUM is judged as abnormal, the estimation model is assumed to be abnormal and thus is also corrected.

Figure 18:
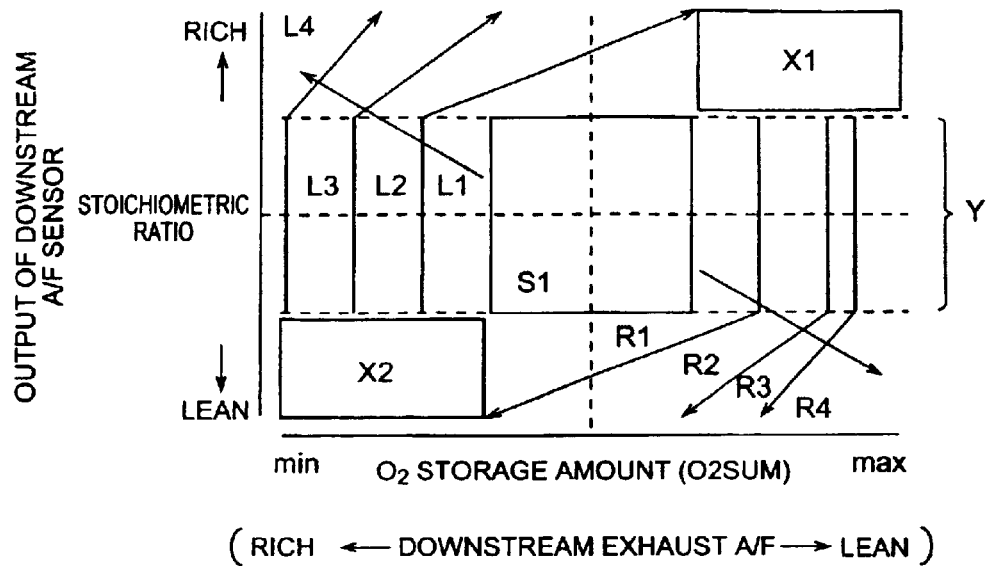
FIG. 18 is a map for A/F control and detection of abnormality based on the relation between oxygen storage amount O2SUM and output of the downstream A/F sensor.

The graph shown in FIG. 18 provides a map used in the abnormal determination described above. In the map shown in FIG. 18, the abscissa represents the calculated oxygen storage amount O2SUM and the ordinate the output of the downstream A/F sensor 26. Concerning the oxygen storage amount O2SUM on the map, the left part represents its minimum side (the side where most oxygen is released: the side where the exhaust A/F is rich), while the right side its maximum side (the side where the catalyst occludes oxygen almost fully: the side where the exhaust A/F is lean). In contrast, the output of the downstream A/F sensor 26 on the map is lean in the lower part and rich in the upper part.

The map is divided into a plurality of regions. First described is a case in which the output of the downstream A/F sensor 26 is near the stoichiometric air-fuel ratio (i.e., in the range Y in the map shown in FIG. 18). This range is a range in which the output of the downstream A/F sensor 26 largely varies because of its output characteristics. Namely, since there are also situations wherein the error is large in the output of the downstream A/F sensor 26 in this range, the A/F control is carried out based on the calculated oxygen storage amount O2SUM.

In the region of zones L1 to L4 in the range Y, the calculated oxygen storage amount O2SUM indicates that the exhaust A/F downstream of the exhaust purifying catalyst 19 is rich. In this case, for making the exhaust purifying catalyst 19 occlude oxygen, the ECU executes such control (lean control) as to move the exhaust A/F downstream of the exhaust purifying catalyst 19 toward the lean side. However, since the exhaust A/F downstream of the exhaust purifying catalyst 19 is richer in the zone L4 than in the zone L1, stronger lean control is implemented in the zone L4 than in the zone L1. Namely, the region is zoned so as to increase the intensity of lean control from the zone L1 toward the zone L4.

In the region of zones R1 to R4 in the range Y, the calculated oxygen storage amount O2SUM indicates that the downstream exhaust A/F of the exhaust purifying catalyst 19 is lean. In this case, the ECU performs such control (rich control) as to move the exhaust A/F downstream of the exhaust purifying catalyst 19 toward the rich side, in order to release the oxygen occluded in the exhaust purifying catalyst 19. However, since the exhaust A/F downstream of the exhaust purifying catalyst 19 is leaner in the zone R4 than in the zone R1, stronger rich control is implemented in the zone R4 than in the zone R1. Namely, the region is zoned so as to increase the intensity of rich control from the zone R1 toward the zone R4.

In the region S1 where the calculated oxygen storage amount O2SUM and the output of the downstream A/F sensor 26 indicate that the exhaust A/F downstream of the exhaust purifying catalyst 19 is near the stoichiometric air-fuel ratio, the ECU performs such A/F control as to maintain the oxygen storage amount O2SUM, without performing either the lean control or the rich control.

The zones L1 to L4 outside the foregoing range Y will be described next. In these zones, the calculated oxygen storage amount O2SUM indicates that the exhaust A/F downstream of the exhaust purifying catalyst 19 is in the range from the stoichiometric air-fuel ratio to rich ratios, while the output of the downstream A/F sensor 26 indicates that the downstream exhaust A/F is rich. In this case, slightly higher regard is paid to the output of the downstream A/F sensor 26 and the aforementioned zone L1 to zone L4 (lean control zones) are set.

Similarly, the zones R1 to R4 outside the foregoing range Y will be described. In these zones, the calculated oxygen storage amount O2SUM indicates that the exhaust A/F downstream of the exhaust purifying catalyst 19 is in the range from the stoichiometric air-fuel ratio to lean ratios, while the output of the downstream A/F sensor 26 does that the downstream exhaust A/F is lean. In this case, slightly higher regard is paid to the output of the downstream A/F sensor 26 and the foregoing zone R1 to zone R4 (rich control zones) are set.

Finally, the cases shown in the region X1 and the region X2 will be described. In the region X1, the calculated oxygen storage amount O2SUM indicates that the downstream exhaust A/F of the exhaust purifying catalyst 19 is lean, while the output of the downstream A/F sensor 26 does that it is rich. In the region X2, the calculated oxygen storage amount O2SUM indicates that the downstream exhaust A/F of the exhaust purifying catalyst 19 is rich, while the output of the downstream A/F sensor 26 does that it is lean.

Namely, in the region X1 and in the region X2, the calculated oxygen storage amount O2SUM discords from the output of the downstream A/F sensor 26. On such occasions, the oxygen storage amount O2SUM is judged as abnormal. In this case, higher regard is paid to the output of the downstream A/F sensor 26 actually detecting the exhaust A/F, and the oxygen storage amount O2SUM can be considered to fail to indicate an accurate value for some reason. Therefore, the ECU once deletes the old estimation history of the oxygen storage amount O2SUM and initiates new estimation of oxygen storage amount O2SUM. Alternatively, the existing history of the oxygen storage amount O2SUM may be modified.

Further, the estimation model of oxygen storage amount O2SUM is modified at the same time as the start of new estimation or the modification of the oxygen storage amount O2SUM. For modifying the estimation model, for example, where the A/F change range $\Delta AF$ is used in the process of estimation of the oxygen storage amount O2SUM as described above, it can be implemented by modifying the value of the stoichiometric air-fuel ratio AFst being the reference in calculation of the A/F change range $\Delta AF$.

Next described is an embodiment in which the A/F control apparatus is further provided with the abnormality determining means for determining that the estimated maximum oxygen storage amount is abnormal, when the maximum oxygen storage amount estimated by the maximum oxygen storage amount estimating means is over a predetermined value.

As described previously, the purification efficiency of exhaust gas is increased herein by controlling the oxygen storage amount O2SUM of the exhaust purifying catalyst 19 and making use of the maximum oxygen storage amount (O2SUMmax−O2SUMmin), but it will become difficult to purify the exhaust gas if the estimated maximum oxygen storage amount (O2SUMmax−O2SUMmin) is abnormal. Since the deterioration of the exhaust purifying catalyst 19 is also detected by making use of the maximum oxygen storage amount (O2SUMmax−O2SUMmin), there is also the possibility of failure in accurate deterioration detection if the estimated maximum oxygen storage amount (O2SUMmax−O2SUMmin) is abnormal. The present embodiment is an embodiment in which when the estimated maximum oxygen storage amount (O2SUMmax−O2SUMmin) is over a predetermined value, the estimated maximum oxygen storage amount (O2SUMmax−O2SUMmin) is judged as abnormal.

The maximum oxygen storage amount (O2SUMmax−O2SUMmin) being abnormal means a state in which the maximum oxygen storage amount (O2SUMmax−O2SUMmin) cannot be estimated accurately. The reasons of the maximum oxygen storage amount (O2SUMmax−O2SUMmin) being abnormal include a case wherein the estimation model of the oxygen storage amount O2SUM as a basis of the estimation is abnormal, a case wherein the sensors for detecting the various information contents used in the estimation of the oxygen storage amount O2SUM are out of order, and so on. The foregoing predetermined value may be set in relation with other information contents, as described below.

Figure 19:
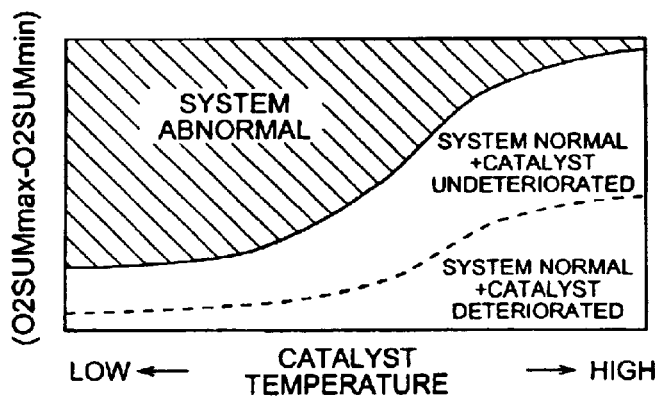
FIG. 19 is a map for detection of abnormality based on the relation between catalyst temperature and maximum oxygen storage amount.

FIG. 19 shows a map used in the determination to determine whether the maximum oxygen storage amount (O2SUMmax−O2SUMmin) is abnormal (or whether the system is abnormal). This map is a two-dimensional map consisting of the maximum oxygen storage amount (O2SUMmax−O2SUMmin) and the temperature of the exhaust purifying catalyst 19. In the map the solid line indicates maximum values that the maximum oxygen storage amount (O2SUMmax−O2SUMmin) takes at respective catalyst temperatures in the undeteriorated state of the exhaust purifying catalyst 19. Namely, since the maximum oxygen storage amount cannot take values over these values, the range indicated by hatching above this solid line is a region in which the maximum oxygen storage amount (O2SUMmax−O2SUMmin) is judged as abnormal.

The catalyst deterioration shown in the lower part of the map is that as described in FIG. 6 and the description thereof is omitted herein. The determination about whether the maximum oxygen storage amount (O2SUMmax−O2SUMmin) is abnormal can be performed upon the update of the maximum oxygen storage amount (O2SUMmax−O2SUMmin) (i.e., upon the update of the maximum O2SUMmax or the minimum O2SUMmin), for example.

Next described is an embodiment in which the A/F control apparatus is further provided with the catalyst deterioration detecting means for detecting the degree of deterioration of the exhaust purifying catalyst, based on a slope of change of the exhaust A/F detected by the downstream exhaust A/F detecting means. In the present embodiment the degree of deterioration of the catalyst is detected based on the change slope of change in the output of the downstream A/F sensor 26.

Figure 20A:
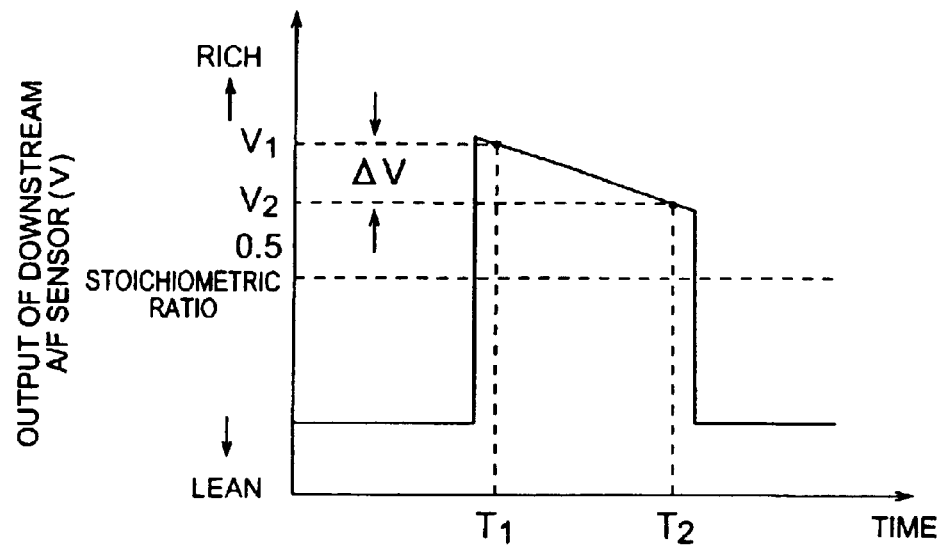
FIG. 20A is a graph showing temporal change in the A/F sensor output and exhaust A/F, which shows change in the output of the downstream A/F sensor.
Figure 20B:
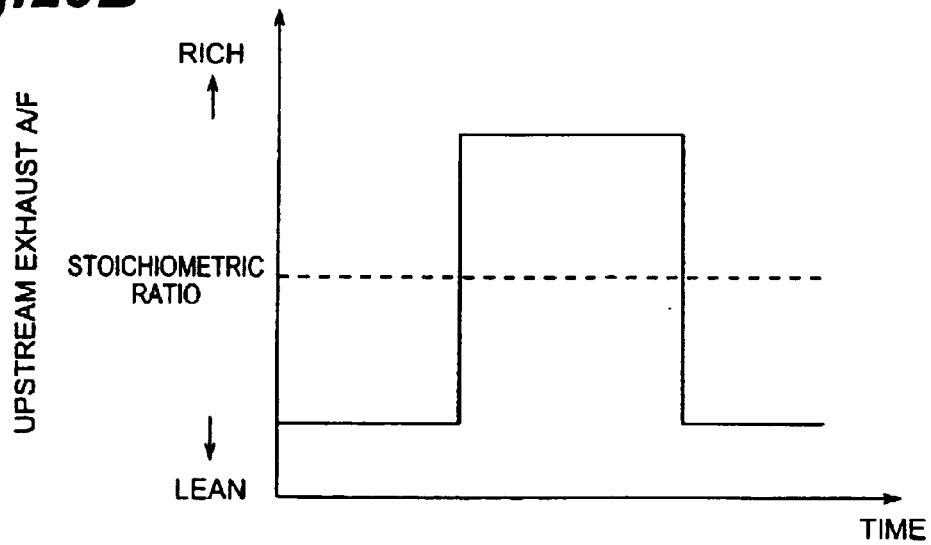
FIG. 20B is a graph showing temporal change in the A/F sensor output and exhaust A/F, which shows change in the exhaust A/F on the upstream side of the exhaust purifying catalyst.

FIG. 20A shows the output of the downstream A/F sensor 26. FIG. 20B shows the exhaust A/F upstream of the exhaust purifying catalyst 19, obtained from the output result of the upstream A/F sensor 25. It is noted here that the lean-rich directions are opposite between FIG. 20A and FIG. 20B. The axes of abscissas in the graphs shown in FIG. 20A and FIG. 20B represent the time and they correspond to each other in terms of time.

As shown in FIG. 20A, while the output of the downstream A/F sensor 26 is lean, the exhaust purifying catalyst 19 fully occludes oxygen and it is considered that oxygen flows to the downstream of the exhaust purifying catalyst 19. For this reason, the exhaust A/F of input gas into the exhaust purifying catalyst 19 is kept rich during this period whereby the exhaust gas is purified by the oxygen occluded in the exhaust purifying catalyst 19.

Since the oxygen occluded in the exhaust purifying catalyst 19 is used up after a while, the output of the downstream A/F sensor 26 turns from lean to rich. Since the oxygen occluded in the exhaust purifying catalyst 19 is consumed completely, unburnt fuel in the input gas is considered to flow to the downstream of the exhaust purifying catalyst 19 without being oxidized. In this case, the exhaust A/F of the input gas into the exhaust purifying catalyst 19 is changed into lean, in order to make the exhaust purifying catalyst 19 occlude oxygen.

After this, the exhaust purifying catalyst 19 comes to occlude oxygen and thus the output gas from the exhaust purifying catalyst 19 contains no oxygen. Therefore, the output of the downstream A/F sensor 26 becomes rich. However, as the exhaust purifying catalyst 19 occludes oxygen, the amount of oxygen flowing to the downstream without being occluded, gradually increases. As a result, as shown in FIG. 20A, the output of the downstream A/F sensor 26 gradually moves toward the lean side. Namely, the output of the downstream A/F sensor 26 has a change slope.

Still after this, at the point when the exhaust purifying catalyst 19 fully occludes oxygen, the downstream A/F sensor 26 again turns to lean and, in response thereto, the exhaust A/F of the input gas into the exhaust purifying catalyst 19 is again changed into rich. In this example, the degree of deterioration of the exhaust purifying catalyst 19 is detected using the foregoing change slope. As also seen from the above-stated description, this change slope reflects the oxygen storage capability of the exhaust purifying catalyst 19. Since the deterioration of the exhaust purifying catalyst 19 lowers the oxygen occlusion capability, it is reflected in the change slope and thus the degree of deterioration of the exhaust purifying catalyst 19 can be detected from the change slope.

The foregoing change slope of output of the downstream A/F sensor 26 appears most prominent and stable upon the start of occlusion from the state in which the exhaust purifying catalyst 19 occludes no oxygen. In the present embodiment, therefore, the degree of deterioration of the exhaust purifying catalyst 19 is determined using the change slope from immediately after the change of the output of the downstream A/F sensor 26 from lean to rich, to immediately before the change from rich to lean.

Figure 21:
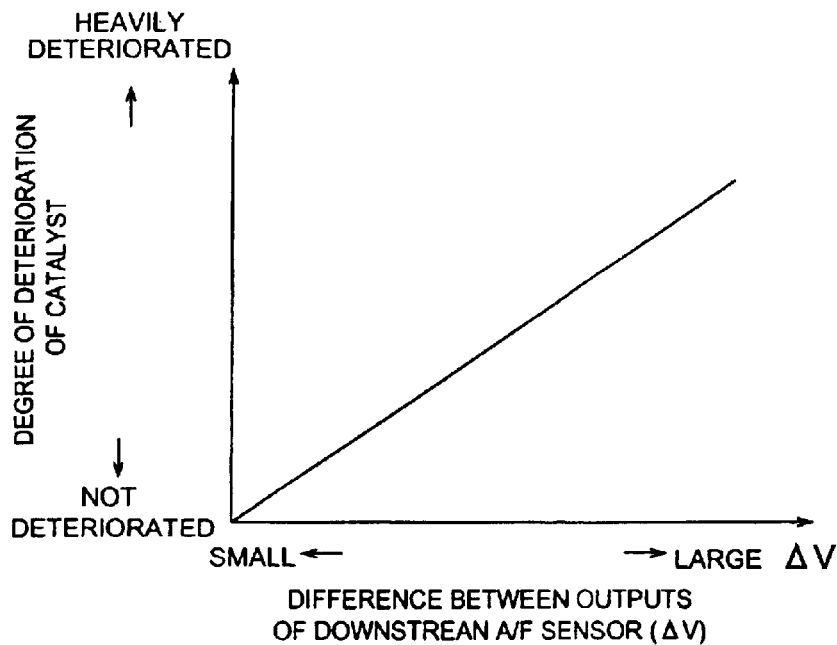
FIG. 21 is a map showing the relation between degree of deterioration of the catalyst and difference between output values of the downstream A/F sensor 26.

First, the output (voltage $V_1$) of the downstream A/F sensor 26 is detected immediately after the change of output of the downstream A/F sensor 26 from lean to rich (at time $T_1$). Further, the output (voltage $V_2$) of the downstream A/F sensor 26 is detected immediately before the change of output of the downstream A/F sensor 26 from rich to lean (at time $T_2$). These detection results are sent to the ECU 18 and the ECU 18 calculates the difference $\Delta V=(V_1-V_2)$ between them. The degree of deterioration of the exhaust purifying catalyst 19 is determined from this difference $\Delta V$ and a map for detection of deterioration degree shown in FIG. 21, which is stored in the ECU 18. Namely, the ECU 18 also functions as the deterioration detecting means herein.

This configuration permits the deterioration degree of the exhaust purifying catalyst 19 to be detected during the normal A/F control, without need for special control and device. It is also possible to raise the deterioration detection accuracy of the exhaust purifying catalyst 19 by using the above detection method in combination with another catalyst deterioration determining method. It is also possible to enhance the purification performance of exhaust gas further more, by feeding the detected deterioration degree of the exhaust purifying catalyst 19 back to the A/F control.

Next described is an embodiment of preliminarily setting a blow-by occurrence oxygen storage amount at which there occurs the blow-by phenomenon not utilizing the oxygen storage capability of the exhaust purifying catalyst fully and calibrating the oxygen storage amount, based on the blow-by occurrence oxygen storage amount upon occurrence of the blow-by phenomenon.

As described above, depending upon the operational state of the engine 1 (e.g., operation at high intake air flows Ga), the oxygen occlusion capability of the exhaust purifying catalyst 19 is not utilized fully and the blow-by phenomenon takes place. In the present embodiment, with occurrence of the blow-by phenomenon, the estimated oxygen storage amount is assumed to include an error and the oxygen storage amount is corrected based on the blow-by occurrence oxygen storage amount.

The blow-by occurrence oxygen storage amount is preliminarily set as a predicted oxygen storage amount where there occurs the blow-by phenomenon not utilizing the oxygen occlusion capability of the exhaust purifying catalyst fully. The blow-by occurrence oxygen storage amount is preliminarily determined, for example, by experiment in consideration of the operational state of the engine 1. The blow-by occurrence oxygen storage amount can be set as a map or according to a reference value and a computational equation used in calculation based on the reference value.

The following will describe an example in which the blow-by occurrence oxygen storage amount is set as a map. This map is an example in which only the intake air flow Ga is taken into account as the operational state of the engine 1. It is, however, noted that various information contents (catalyst temperature, catalyst deterioration degree, passing gas flow rate, etc.) except for the intake air flow Ga can also be taken into account as the operational state of the engine 1, of course.

Figure 22:
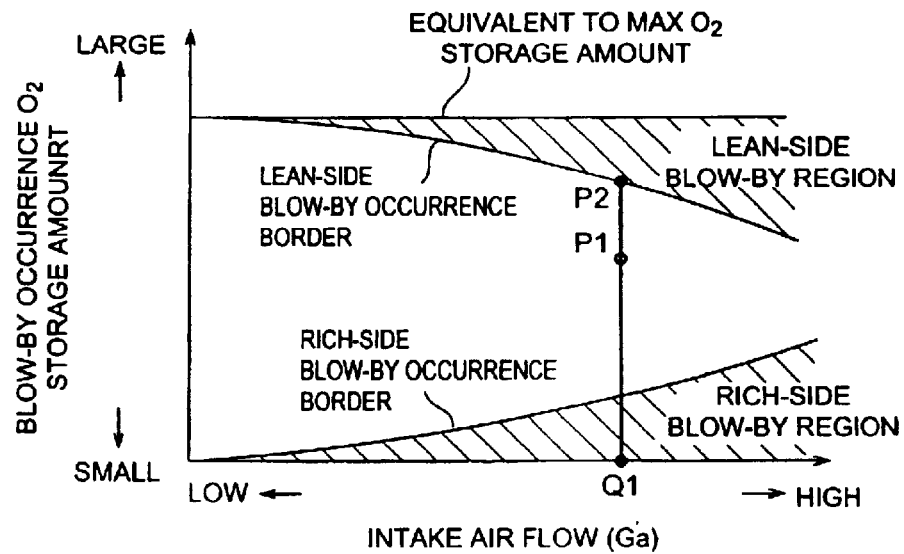
FIG. 22 is a map showing the relation between intake air flow Ga and blow-by occurrence oxygen storage amount.

FIG. 22 shows an example of the map defining the blow-by occurrence oxygen storage amount. This map is stored in the ECU 18. With increase in the intake air flow Ga the velocity of the exhaust gas passing through the exhaust purifying catalyst 19 becomes faster, and the exhaust gas flows to the downstream of the exhaust purifying catalyst 19 before completion of sufficient purification reaction of exhaust gas. For this reason, the blow-by region becomes wider with increase in the intake air flow Ga, as shown in FIG. 22.

The blow-by region involves a lean blow-by region where oxygen flows to the downstream of the exhaust purifying catalyst 19 though the exhaust purifying catalyst 19 still has its capacity available for occlusion of oxygen, and a rich blow-by region where the unburnt fuel in the exhaust gas flows to the downstream of the exhaust purifying catalyst 19 without being oxidized fully though the exhaust purifying catalyst 19 still has its capacity available for release of oxygen. Then the lower border of the lean blow-by region is a lean-side blow-by occurrence oxygen storage amount, and the upper border of the rich blow-by region a rich-side blow-by occurrence oxygen storage amount.

For example, let us consider a situation of such detection that the exhaust A/F downstream of the exhaust purifying catalyst 19 turns lean at a certain point, from the output of the downstream A/F sensor 26. The intake air flow $Ga(Q_1)$ at this time is detected and sent to the ECU 18. The ECU 18 determines the blow-by occurrence oxygen storage amount (the lean blow-by occurrence oxygen storage amount in this case) $P_2$ corresponding to this intake air flow $Ga(Q_1)$. At this time, the position on the map corresponding to the calculated oxygen storage amount O2SUM was $P_1$. In this case, the calculated oxygen storage amount O2SUM is corrected to a value corresponding to $P_2$ obtained from the map.

In this embodiment, in addition to the correction of the calculated oxygen storage amount O2SUM, the estimation model of oxygen storage amount O2SUM is also modified. Specifically, when the A/F change range ΔAF is used in the process of estimation of the oxygen storage amount O2SUM as described above, it can be implemented by correcting the value of the stoichiometric air-fuel ratio AFst being the reference in the calculation of the A/F change range ΔAF.

In the case of the control in the description based on FIG. 2, the update of the oxygen storage amount O2SUM was simply inhibited when the downstream A/F sensor 26 provided the rich or lean output (also including cases independent of the blow-by phenomenon), but it is also feasible to increase the estimation accuracy of the oxygen storage amount O2SUM, by also using the control of correcting the oxygen storage amount O2SUM in consideration of the blow-by phenomenon, as described herein.

Next described is an embodiment in which the A/F control apparatus is further provided with the storage amount target setting means for setting an oxygen storage target set based on an estimated maximum oxygen storage estimate and in which the storage target setting means applies forced oscillation to the oxygen storage target.

For estimating the maximum oxygen storage amount (O2SUMmax−O2SUMmin), it is necessary to detect the maximum O2SUMmax and the minimum O2SUMmin of the oxygen storage amount O2SUM. The present embodiment is configured to apply the forced oscillation to the oxygen storage target O2SUMref and thereby detect the maximum O2SUMmax and minimum O2SUMmin in the early stage, in order to obtain the maximum oxygen storage amount (O2SUMmax−O2SUMmin) earlier. At this time, the amplitude of the forced oscillation given to the oxygen storage target O2SUMref is set small, whereby the control system of the oxygen storage amount O2SUM is prevented from being disturbed.

In this embodiment the oxygen storage amount O2SUM is fluctuated by giving the forced oscillation of small amplitude to the oxygen storage target O2SUMref. By fluctuating the oxygen storage amount O2SUM, the exhaust A/F of the input gas into the exhaust purifying catalyst 19 is controlled so as to become a little lean or a little rich. While the exhaust A/F of the input gas into the exhaust purifying catalyst 19 is maintained in the state of being a little lean, the exhaust purifying catalyst 19 continues occluding oxygen to detect the maximum O2SUMmax of the oxygen storage amount O2SUM. After the detection of the maximum O2SUMmax, the exhaust A/F of the input gas into the exhaust purifying catalyst 19 is maintained in the state of being a little rich this time, and the exhaust purifying catalyst 19 continues releasing oxygen to detect the minimum O2SUMmin of the oxygen storage amount O2SUM.

By giving the forced oscillation to the oxygen storage target O2SUMref in this way, the maximum oxygen storage amount (O2SUMmax−O2SUMmin) can be estimated earlier. Since the amplitude of oscillation on this occasion is set small, the A/F of the engine 1 is prevented from being largely fluctuated, which can avoid induction of the blow-by phenomenon and insufficient purification of exhaust gas. Even if disturbance occurs over the oxygen storage capability of the exhaust purifying catalyst 19, the failure in purification of exhaust gas can be minimized, because the input gas into the exhaust purifying catalyst 19 is controlled at points near the stoichiometric air-fuel ratio. In this embodiment the ECU 18 functions as the storage amount target setting means for setting the oxygen storage target O2SUMref.

Next described is an embodiment in which the A/F target setting means sets a target so as to gradually increase the amplitude of controlled A/F. Described along therewith is an embodiment in which the A/F target setting means sets a target so as to gradually prolong the cycle (cyclic period) of controlled A/F.

In the above embodiment using the forced oscillation, the oscillation was given to the oxygen storage target O2SUMref, so as to fluctuate the controlled A/F of the engine 1. In the present embodiment, the target of controlled A/F is set to give oscillation to the controlled A/F so as to gradually increase the amplitude of controlled A/F. In another embodiment described herein, the target of controlled A/F is set to give oscillation to the controlled A/F so as to gradually prolong the cycle of controlled A/F.

By oscillating the controlled A/F, it is feasible to promote the detection of the maximum O2SUMmax of the oxygen storage amount O2SUM with the exhaust A/F of exhaust gas on the lean side and the detection of the minimum O2SUMmin with the exhaust A/F on the rich side. As a consequence, the maximum oxygen storage amount (O2SUMmax−O2SUMmin) can be estimated earlier. At this time, the controlled A/F is oscillated so as to gradually increase the amplitude thereof, thereby minimizing degradation of exhaust emission and degradation of drivability due to the oscillation of controlled A/F.

During such control as to gradually increase the amplitude of controlled A/F, the storage amount increases or decreases only within the range of oxygen storage capability of the exhaust purifying catalyst 19 in the small amplitude range and the maximum O2SUMmax and minimum O2SUMmin cannot be detected there in some cases. However, there occurs neither the degradation of exhaust emission nor the degradation of drivability in that range. As the amplitude is gradually increased, the maximum O2SUMmax and minimum O2SUMmin are detected somewhere a little over the oxygen occlusion capability of the exhaust purifying catalyst 19. Since the oscillation is kept from largely exceeding the oxygen occlusion capability of the exhaust purifying catalyst 19, there occurs neither the degradation of exhaust emission nor the degradation of drivability in this case, either.

Similarly, when the controlled A/F is oscillated so as to gradually prolong the cycle thereof, it is feasible to minimize the degradation of exhaust emission and the degradation of drivability due to the oscillation of controlled A/F. As the cycle of controlled A/F is controlled so as to become gradually longer, the storage amount increases or decreases only within the range of oxygen occlusion capability of the exhaust purifying catalyst 19 in the short cyclic period range, and the maximum O2SUMmax and minimum O2SUMmin cannot be detected there in certain cases. However, there occurs neither the degradation of exhaust emission nor the degradation of drivability in that range. As the cycle is gradually increased, the maximum O2SUMmax and minimum O2SUMmin are detected somewhere a little over the oxygen occlusion capability of the exhaust purifying catalyst 19. Since the oscillation is kept from largely exceeding the oxygen occlusion capability of the exhaust purifying catalyst 19, there occurs neither the degradation of exhaust emission nor the degradation of drivability in this case, either.

Next described is an embodiment in which the A/F control apparatus is further provided with the storage amount target setting means for setting the oxygen storage target and in which the storage amount target setting means sets a plurality of targets between the minimum and maximum of oxygen storage amount and sets a control target by switching among them.

In the description based on FIG. 2, only one target of oxygen storage amount O2SUM (oxygen storage target O2SUMref) is set at a certain point. Then the oxygen storage amount O2SUM was controlled to converge toward this single oxygen storage target O2SUMref. In the present embodiment, a plurality of targets of oxygen storage amount O2SUM are set simultaneously and the control is executed while switching among these targets.

In the control described heretofore, the oxygen storage target O2SUMref was set near the center of the maximum oxygen storage amount (O2SUMmax−O2SUMmin) whereby the margins not exceeding the oxygen occlusion capability were given both on the oxygen occlusion side and on the oxygen release side. With improvement in the control of oxygen storage amount O2SUM, however, the margins of oxygen occlusion capability will not be used and can be wastefully retained. About the oxygen occlusion capability of the exhaust purifying catalyst 19, the inventors found the fact that the purification efficiency was increased by forcibly bringing about the purification reaction of exhaust gas with slight fluctuation of oxygen storage amount, rather than maintaining the oxygen storage amount O2SUM at a constant value.

In this embodiment, a plurality of targets of oxygen storage amount O2SUM are thus set between the maximum O2SUMmax and the minimum O2SUMmin and the control targets are used as periodically switched one from another, thereby utilizing the oxygen occlusion capability of the exhaust purifying catalyst 19 more effectively. In the description below, we will explain an example in which two targets of oxygen storage amount O2SUM are set. The targets set herein are variable depending upon the operational state of the engine 1.

Figure 23:
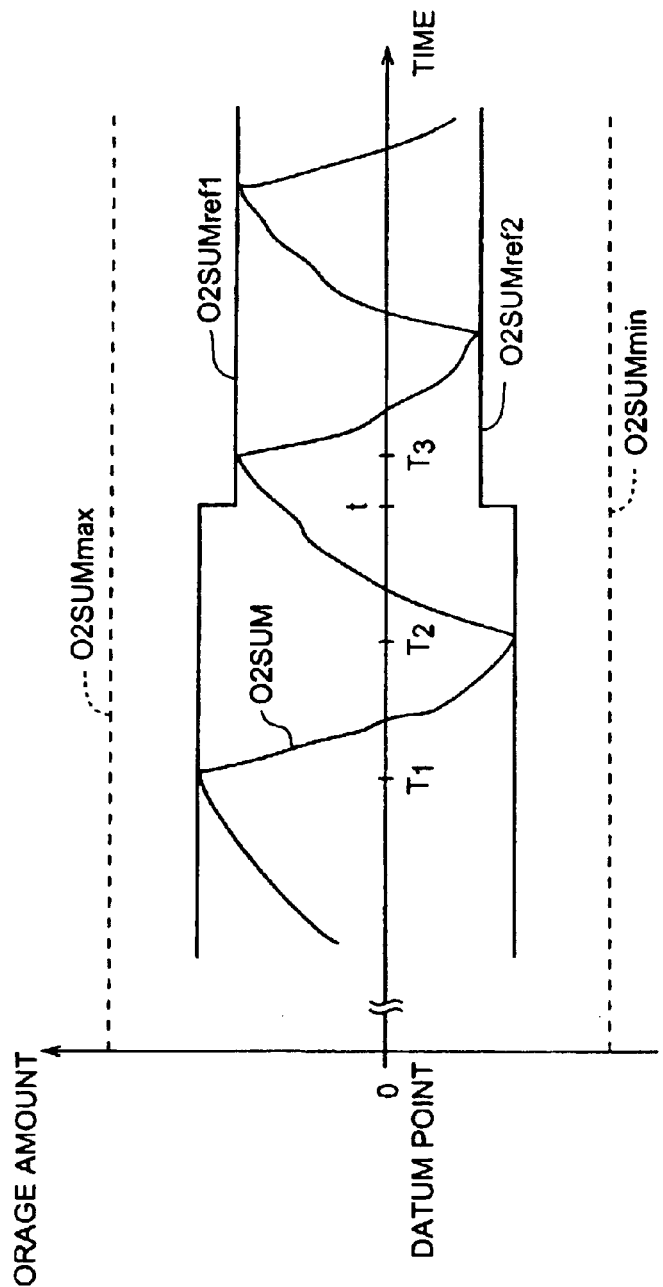
FIG. 23 is a timing chart showing change states of the oxygen storage amount O2SUM of the exhaust purifying catalyst and control targets O2SUMref1, O2SUMref2.

FIG. 23 shows the relation of the oxygen storage amount O2SUM and the control targets O2SUMref1, O2SUMref2 with time during the aforementioned control. In this example, a pair of control targets O2SUMref1, O2SUMref2 are set according to the operational state of the engine 1. The control targets O2SUMref1, O2SUMref2 are changed into other values at the time t when the operational state of the engine 1 (not only the state of the main body of the engine 1, but also the state of the intake/exhaust systems) varies. Although in this example the pair of control targets O2SUMref1, O2SUMref2 are changed simultaneously, they may be arranged to be changed separately from each other.

In this example the control target O2SUMref1 is set on the large side of oxygen storage amount O2SUM, while the control target O2SUMref2 is on the small side of oxygen storage amount O2SUM. For example, in a certain operational state of the engine 1, the control target O2SUMref1 is set to about 80% of the maximum oxygen storage amount (O2SUMmax−O2SUMmin) and the control target O2SUMref2 to about 20% of the maximum oxygen storage amount (O2SUMmax−O2SUMmin). In another operational state, the control target O2SUMref1 is set to about 60% of the maximum oxygen storage amount (O2SUMmax−O2SUMmin) and the control target O2SUMref2 to about 40% of the maximum oxygen storage amount (O2SUMmax−O2SUMmin).

In the graph shown in FIG. 23, since the maximum O2SUMmax and minimum O2SUMmin of the oxygen storage amount O2SUM are not updated, there is no change in the maximum oxygen storage amount (O2SUMmax−O2SUMmin). However, when the control targets O2SUMref1, O2SUMref2 are set in the relation with the maximum oxygen storage amount (O2SUMmax−O2SUMmin), if the maximum O2SUMmax or the minimum O2SUMmin is updated the control targets O2SUMref1, O2SUMref2 can also be updated in some cases.

Then the actual target of oxygen storage amount O2SUM is switched alternately between the control targets O2SUMref1, O2SUMref2. For example, during the period $T_1$ to $T_2$, the control target O2SUMref2 is set as the actual target of oxygen storage amount O2SUM, so that the oxygen storage amount O2SUM is controlled so as to converge toward the control target O2SUMref2. On the other hand, during the period $T_2$ to $T_3$, the control target O2SUMref1 is set as the actual target of oxygen storage amount O2SUM, so that the oxygen storage amount O2SUM is controlled so as to converge toward the control target O2SUMref1.

The setting method of the control targets O2SUMref1, O2SUMref2 is not limited to the above method. For example, the control targets O2SUMref1, O2SUMref2 may be determined by the difference from the aforementioned oxygen storage target O2SUMref. Further, the switching between the control targets O2SUMref1, O2SUMref2 does not always have to be alternate, but selective switching between them may be employed, e.g., depending upon operational states of the engine 1. Furthermore, three or more control targets may be set.

Next described is an embodiment in which the A/F target setting means sets the target of controlled A/F in the lean region immediately after cold starting or during the low-load operation of the internal combustion engine. Also described along therewith is an embodiment in which the A/F target setting means sets the target of controlled A/F in the rich region during the high-load operation of the internal combustion engine. Further, also described is an embodiment in which the A/F target setting means sets the target of controlled A/F in the rich region before execution of cutting the fuel into the internal combustion engine or before stopping the internal combustion engine. These embodiments concern the setting of controlled A/F for fully utilizing the oxygen occlusion capability.

First described is the embodiment wherein the target of controlled A/F is set in the lean region immediately after cold starting or during the low-load operation. Immediately after cold starting or during the low-load operation, there is such a tendency that combustion is incomplete in the engine 1 to leave unburnt fuel in exhaust gas and bring the exhaust A/F toward the rich side. For this reason, the oxygen occluded in the exhaust purifying catalyst 19 becomes easier to be released and it grows concern about insufficiency of oxygen storage amount O2SUM. Therefore, the target of controlled A/F is set in the lean region immediately before cold starting or during the low-load operation to bring the exhaust A/F toward the lean side in advance, thereby preventing the oxygen storage amount O2SUM from becoming small.

Next described is the embodiment in which the target of controlled A/F is set in the rich region during the high-load operation. During the high-load operation, the combustion temperature in the engine 1 becomes high and there is such a tendency that the exhaust gas contains a lot of nitrogen oxides (NOx). For this reason, the exhaust purifying catalyst 19 occludes oxygen evolved after the reduction of nitrogen oxides (NOx) and the oxygen storage amount O2SUM tends to become excess. This grows the concern about incapability of sufficient purification upon incoming of exhaust gas at lean exhaust A/Fs. Therefore, the target of controlled A/F is set in the rich region during the high-load operation to bring the exhaust A/F toward the rich side in advance, thereby preventing the oxygen storage amount O2SUM from becoming excess.

A similar situation is a case of increasing the fuel. With increase in the fuel, the exhaust A/F of the exhaust gas flowing into the exhaust purifying catalyst 19 becomes rich to decrease the oxygen storage amount O2SUM of the exhaust purifying catalyst 19. Therefore, if an operation period of setting the target of controlled A/F in the lean region is provided before the increase of fuel, the oxygen storage amount O2SUM can be prevented from becoming insufficient during the increase of fuel.

Next described is the embodiment in which the operation period of setting the target of controlled A/F in the rich region before execution of fuel cutting or before the stop of engine 1. Since air alone without fuel flows into the exhaust purifying catalyst 19 upon the execution of fuel cutting or upon the stop of engine 1 (or upon a restart after a stop), the oxygen storage amount O2SUM tends to become excess. This grows the concern about incapability of sufficient purification upon incoming of exhaust gas at lean exhaust A/Fs thereafter. Therefore, an operation period of setting the target of controlled A/F in the rich region is provided before the execution of fuel cutting or before the stop of the engine 1 to decrease the oxygen storage amount O2SUM of the exhaust purifying catalyst 19, thereby getting ready for the occlusion of oxygen upon the execution of fuel cutting or upon the stop of the engine 1.

This operation period before the stop of the engine can be preferably provided, for example, as a period of operating the engine 1 in the aforementioned state for a fixed time without stopping the engine at the same time as ignition off. Since this period can be a period of approximately several revolutions to ten and several revolutions of the engine 1, it will not cause the driver to feel uncomfortable. For controlling the A/F of the engine 1 by the variation of the target of controlled A/F as described above, there are also situations wherein it is effective to vary the A/F by a rich spike or lean spike, depending upon circumstances (e.g., immediately before execution of fuel increase). On that occasion, the spike can be interposed so as to exceed the amount of oxygen that the exhaust purifying catalyst 19 can occlude or release within a unit time.

Concerning these three embodiments, one of techniques for changing the target of controlled A/F is a method of changing the oxygen storage target O2SUMref. The oxygen storage target O2SUMref is set on the occlusion side in order to increase the current oxygen storage amount O2SUM, whereby the A/F target setting means sets the target of controlled A/F on the lean side (the side where the exhaust gas is purified by occlusion of oxygen in the exhaust gas). In contrast with it, the oxygen storage target O2SUMref is set on the release side in order to decrease the current oxygen storage amount O2SUM, whereby the A/F target setting means sets the target of controlled A/F on the rich side (the side where the exhaust gas is purified by release of occluded oxygen).

Next described is an embodiment in which the A/F target setting means sets a gain of A/F feedback, based on the oxygen storage amount estimated by the oxygen storage amount estimating means or based on the maximum oxygen storage amount estimated by the maximum oxygen storage amount estimating means.

In the present embodiment, the gain of A/F feedback is changed according to the estimated, oxygen storage amount O2SUM or maximum oxygen storage amount (O2SUMmax−O2SUMmin). In this embodiment, how large margins remain relative to the maximum O2SUMmax and minimum O2SUMmin of oxygen storage amount O2SUM is acquired from the foregoing oxygen storage amount O2SUM or maximum oxygen storage amount (O2SUMmax–O2SUMmin) and the A/F feedback gain is varied according thereto. The A/F feedback gain is varied by changing a controlled variable in the A/F feedback.

Depending upon operational states of the engine 1, in spite of some margin remaining in the oxygen occlusion capability of the exhaust purifying catalyst 19, there can occur the blow-by phenomenon that the nitrogen oxides NOx, carbon monoxide CO, and hydrocarbons HC flow to the downstream of the exhaust purifying catalyst 19, which was already described. This blow-by phenomenon occurs easier as the oxygen storage amount O2SUM becomes closer to the maximum O2SUMmax or the minimum O2SUMmin.

An example of control herein is one in which as the oxygen storage amount O2SUM becomes closer to the maximum O2SUMmax or the minimum O2SUMmin, the A/F feedback gain is increased, so as to effect quick transfer from the state of readily causing blow-by to the state of not causing blow-by readily. On the other hand, while the oxygen storage amount O2SUM is approximately in the center between the maximum O2SUMmax and the minimum O2SUMmin, the A/F feedback gain is set relatively small. This can prevent the control system of the A/F feedback from being disturbed, and thus permits stabler control.

In another example, when the maximum oxygen storage amount (O2SUMmax–O2SUMmin) becomes small, since blow-by occurs easier, the A/F feedback gain is increased to resist occurrence of blow-by. In still another example, the A/F feedback gain is increased as the oxygen storage amount O2SUM becomes farther from the oxygen storage amount target O2SUMref, so as to converge the oxygen storage amount O2SUM to the oxygen storage target O2SUMref earlier. The oxygen storage target O2SUMref is obtained from the oxygen storage amount O2SUM or the maximum oxygen storage amount (O2SUMmax–O2SUMmin).

The A/F feedback gain is set based on either one or both of the oxygen storage amount O2SUM and the maximum oxygen storage amount (O2SUMmax–O2SUMmin). Alternatively, the A/F feedback gain may also be determined based on the maximum O2SUMmax and minimum O2SUMmin obtained from the oxygen storage amount O2SUM or the maximum oxygen storage amount (O2SUMmax–O2SUMmin). Specifically, the A/F feedback gain can be varied by changing a controlled variable in the A/F feedback control.

Next described is an embodiment in which the A/F control apparatus is further provided with the catalyst deterioration detecting means. This catalyst deterioration detecting means detects the deterioration of the exhaust purifying catalyst, based on the output of the downstream exhaust A/F detecting means when the controlled A/F is controlled so that the oxygen A/D amount becomes within a range of instantaneously occludable oxygen amount or instantaneously releasable oxygen amount in a nondeteriorated state of the exhaust purifying catalyst.

The exhaust purifying catalyst 19 can occlude or release oxygen within the range of maximum oxygen storage amount (O2SUMmax–O2SUMmin) because of its oxygen occlusion capability. However, the catalyst cannot instantaneously release all the oxygen occluded or instantaneously occlude oxygen to the full occlusion capacity. There is also a limit to the amount of oxygen that the exhaust purifying catalyst 19 can instantaneously adsorb or desorb. Here we will define the instantaneously occludable oxygen amount as an amount of oxygen that the exhaust purifying catalyst 19 can instantaneously occlude, and the instantaneously releasable oxygen amount as an amount of oxygen that the catalyst can instantaneously release.

This instantaneously occludable oxygen amount or instantaneously releasable oxygen amount changes with progress in deterioration of the exhaust purifying catalyst 19. In the present embodiment, the deterioration of the exhaust purifying catalyst 19 is detected by making use of this instantaneously occludable oxygen amount or instantaneously releasable oxygen amount, and the deterioration of the exhaust purifying catalyst 19 is detected based on the output of the downstream A/F sensor 26 when the controlled A/F is controlled so that the oxygen A/D amount O2AD is in the range of the instantaneously occludable oxygen amount or instantaneously releasable oxygen amount in the nondeteriorated state of the exhaust purifying catalyst 19.

Figure 24A:
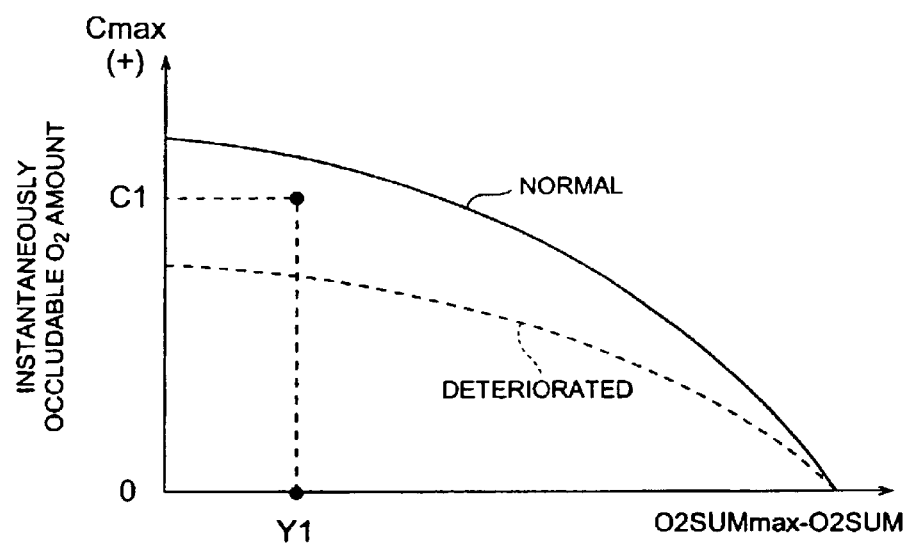
FIG. 24A is a graph showing the relation between oxygen storage amount O2SUM (and maximum thereof O2SUMmax) and instantaneously occludable oxygen amount Cmax.
Figure 24B:
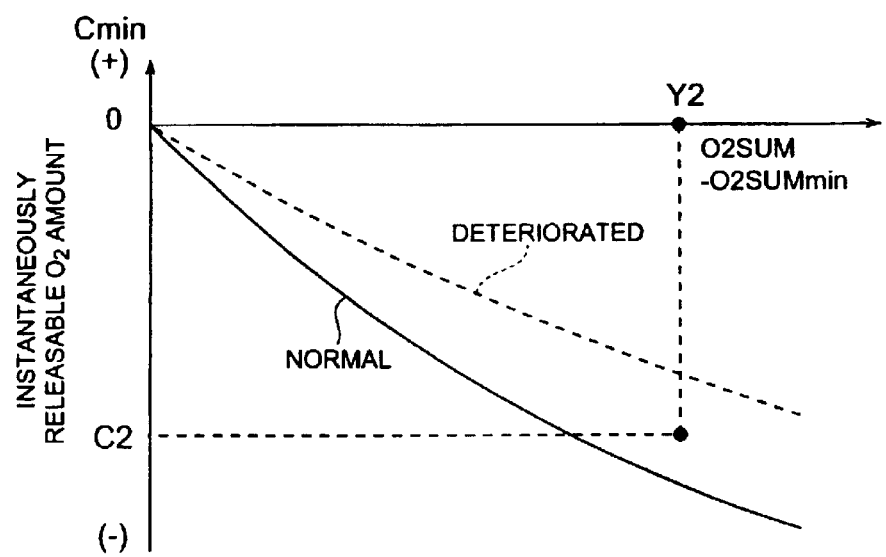
FIG. 24B is a graph showing the relation between oxygen storage amount O2SUM (and minimum thereof O2SUMmin) and instantaneously releasable oxygen amount Cmin.

FIG. 24A shows the relation between instantaneously occludable oxygen amount Cmax and oxygen storage amount O2SUM. FIG. 24B shows the relation between instantaneously releasable oxygen amount Cmin and oxygen storage amount O2SUM. The axis of abscissas in the graph shown in FIG. 24A represents the difference between the oxygen storage amount O2SUM and its maximum O2SUMmax, which indicates the occlusion-side margin of the oxygen occlusion capability of the exhaust purifying catalyst 19. The axis of abscissas in the graph shown in FIG. 24B represents the difference between the oxygen storage amount O2SUM and its minimum O2SUMmin, which indicates the release-side margin of the oxygen occlusion capability of the exhaust purifying catalyst 19.

In FIG. 24A and FIG. 24B, curves indicated by respective solid lines represent the instantaneously occludable oxygen amount Cmax and the instantaneously releasable oxygen amount Cmin in the normal state of the exhaust purifying catalyst 19. In FIG. 24A and FIG. 24B, curves indicated by respective dashed lines represent the instantaneously occludable oxygen amount Cmax and the instantaneously releasable oxygen amount Cmin in a state in which the exhaust purifying catalyst 19 is judged as deteriorated.

As shown in FIG. 24A, the larger the margin of the current oxygen storage amount O2SUM to the maximum O2SUMmax, the larger the instantaneously occludable oxygen amount Cmax becomes. Likewise, as shown in FIG. 24B, the larger the margin of the current oxygen storage amount O2SUM to the minimum O2SUMmin, the smaller the instantaneously releasable oxygen amount Cmin becomes (because the oxygen release side is defined in the negative domain herein).

For example, supposing current (O2SUMmax–O2SUMmin) is Y1, the controlled A/F of the engine 1 is controlled to adjust the oxygen A/D amount O2AD toward C1 (also including the control of intake air flow associated with the passing gas rate through the exhaust purifying catalyst 19). The A/F control at this time is lean control (which may be one causing instantaneous A/F variation so called the lean spike). If the exhaust purifying catalyst 19 is normal, the exhaust purifying catalyst 19 must be able to occlude all oxygen in the lean exhaust gas resulting from this A/F control.

However, if the exhaust purifying catalyst 19 becomes deteriorated, part of oxygen will not be occluded in the exhaust purifying catalyst 19, so that the exhaust A/F downstream of the exhaust purifying catalyst 19 will become lean and be so detected by the downstream A/F sensor 26. When the downstream A/F sensor 26 detects the lean A/F during execution of such lean control as to control the oxygen A/D amount O2AD to within the range of the instantaneously occludable oxygen amount Cmax in the normal state (or nondeteriorated state) of the exhaust purifying catalyst 19, the exhaust purifying catalyst 19 can be judged as deteriorated.

Similarly, supposing current (O2SUMmax–O2SUMmin) is Y2, the controlled A/F of the engine 1 is controlled so as to control the oxygen A/D amount O2AD toward C2 (also including the control of intake air flow associated with the passing gas rate through the exhaust purifying catalyst 19). The A/F control at this time is rich control (which may be one causing instantaneous A/F variation so called the rich spike). If the exhaust purifying catalyst 19 is normal, the exhaust purifying catalyst 19 must be able to release a sufficient amount of oxygen necessary for the purification of the rich exhaust gas resulting from this A/F control.

However, if the exhaust purifying catalyst 19 becomes deteriorated, the oxygen release amount from the exhaust purifying catalyst 19 will become insufficient and the exhaust A/F downstream of the exhaust purifying catalyst 19 will become rich and be so detected by the downstream A/F sensor 26. When the downstream A/F sensor 26 detects the rich A/F during the execution of such rich control as to control the oxygen A/F amount O2AD to within the range of the instantaneously releasable oxygen amount Cmin in the normal state (or nondeteriorated state) of the exhaust purifying catalyst 19, the exhaust purifying catalyst 19 can be judged as deteriorated.

Whether the lean spike control or the rich spike control is determined here according to the oxygen storage amount O2SUM at that time. Specifically, comparison is made between the instantaneous-occlusion-side margin and the instantaneous-release-side margin of the exhaust purifying catalyst 19 and the A/F is controlled toward the side with a greater margin. Namely, the lean spike control is employed in the case of the margin larger on the instantaneous occlusion side and the margin smaller on the instantaneous release side, and the rich spike control in the case of the margin smaller on the instantaneous occlusion side and the margin larger on the instantaneous release side. FIG. 24A and FIG. 24B also illustrate an example of such cases.

This permits more accurate and stabler deterioration detection, as also seen from the large difference between the normal-state curves and the deteriorated-state curves in FIG. 24A and FIG. 24B. Since the deterioration detection is one based on the instantaneously occluded or released oxygen amount, the A/F control for the deterioration detection requires only a short period, so as not to induce the degradation of exhaust emission and the degradation of drivability. Although the maps shown in FIGS. 24A, 24B are two-dimensional maps, three or more-dimensional maps may also be employed by adding other parameters such as the catalyst temperature and others to them.

The present invention is not limited to each of the embodiments described above. For example, the oxygen storage amount estimating means estimated the oxygen storage amount O2SUM from the history of oxygen A/D amount O2AD calculated from the A/F of engine 1 and the above-stated embodiments used the output of the upstream A/F sensor 25 as the A/F for the calculation of oxygen A/D amount O2AD. It is, however, also possible to use the controlled A/F of the engine 1 as the A/F for the calculation of oxygen A/D amount. As another example, it is also possible to use the A/F obtained from the aforementioned fuel behavior model or combustion model.

The present invention effectively utilizes the oxygen occlusion capability of the exhaust purifying catalyst, thereby permitting improvement in the performance of purifying, the exhaust gas and improvement in the catalyst deterioration detecting performance using the oxygen occlusion capability.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An air-fuel ratio control apparatus of an internal combustion engine, comprising:

oxygen storage amount estimating means for estimating an oxygen storage amount of an exhaust purifying catalyst located on an exhaust path of the internal combustion engine, based on a history of an oxygen adsorption/desorption amount calculated from an air-fuel ratio of said internal combustion engine;

downstream exhaust air-fuel ratio detecting means located downstream of said exhaust purifying catalyst on said exhaust path, for detecting an exhaust air-fuel ratio downstream of said exhaust purifying catalyst;

maximum oxygen storage amount estimating means for estimating a maximum oxygen storage amount, based on an oxygen storage amount estimate estimated when the exhaust air-fuel ratio detected by said downstream exhaust air-fuel ratio detecting means is a predetermined air-fuel ratio;

air-fuel ratio target setting means for setting a target of a controlled air-fuel ratio, based on the maximum oxygen storage amount estimate; and further comprising storage amount target setting means for setting an oxygen storage amount target, based on the maximum oxygen storage estimate estimated, wherein said storage amount target setting means applies forced oscillation to the oxygen storage amount target.

2. An air-fuel ratio control apparatus of an internal combustion engine, comprising:

oxygen storage amount estimating means for estimating an oxygen storage amount of an exhaust purifying catalyst located on an exhaust path of the internal combustion engine, based on a history of an oxygen adsorption/desorption amount calculated from an air-fuel ratio of said internal combustion engine;

downstream exhaust air-fuel ratio detecting means located downstream of said exhaust purifying catalyst on said exhaust path, for detecting an exhaust air-fuel ratio downstream of said exhaust purifying catalyst;

maximum oxygen storage amount estimating means for estimating a maximum oxygen storage amount, based on an oxygen storage amount estimate estimated when the exhaust air-fuel ratio detected by said downstream exhaust air-fuel ratio detecting means is a predetermined air-fuel ratio;

air-fuel ratio target setting means for setting a target of a controlled air-fuel ratio, based on the maximum oxygen storage amount estimate; and wherein said air-fuel ratio target setting means sets the target so as to give oscillation to the controlled air-fuel ratio to gradually increase the amplitude of the controlled air-fuel ratio.

3. An air-fuel ratio control apparatus of an internal combustion engine, comprising:

oxygen storage amount estimating means for estimating an oxygen storage amount of an exhaust purifying catalyst located on an exhaust path of the internal combustion engine, based on a history of an oxygen adsorptionldesorption amount calculated from an air-fuel ratio of said internal combustion engine;

downstream exhaust air-fuel ratio detecting means located downstream of said exhaust purifying catalyst on said exhaust path, for detecting an exhaust air-fuel ratio downstream of said exhaust purifying catalyst;

maximum oxygen storage amount estimating means for estimating a maximum oxygen storage amount, based on an oxygen storage amount estimate estimated when the exhaust air-fuel ratio detected by said downstream exhaust air-fuel ratio detecting means is a predetermined air-fuel ratio;

air-fuel ratio target setting means for setting a target of a controlled air-fuel ratio, based on the maximum oxygen storage amount estimate; and wherein said air-fuel ratio target setting means sets the target so as to give oscillation to the controlled air-fuel ratio to gradually prolong the cycle of the controlled air-fuel ratio.

4. An air-fuel ratio control apparatus of an internal combustion engine, comprising:

oxygen storage amount estimating means for estimating an oxygen storage amount of an exhaust purifying catalyst located on an exhaust path of the internal combustion engine, based on a history of an oxygen adsorption/desorption amount calculated from an air-fuel ratio of said internal combustion engine;

downstream exhaust air-fuel ratio detecting means located downstream of said exhaust purifying catalyst on said exhaust path, for detecting an exhaust air-fuel ratio downstream of said exhaust purifying catalyst;

maximum oxygen storage amount estimating means for estimating a maximum oxygen storage amount, based on an oxygen storage amount estimate estimated when the exhaust air-fuel ratio detected by said downstream exhaust air-fuel ratio detecting means is a predetermined air-fuel ratio;

air-fuel ratio target setting means for setting a target of a controlled air-fuel ratio, based on the maximum oxygen storage amount estimate; and further comprising storage amount target setting means for setting an oxygen storage amount target, wherein said storage amount target setting means sets a plurality of targets between a minimum and a maximum of the oxygen storage amount and sets a control target by switching among the targets.

* * * * *